(12) United States Patent
Yamane et al.

(10) Patent No.: US 12,152,934 B2
(45) Date of Patent: Nov. 26, 2024

(54) OPTICAL DEVICE

(71) Applicant: TDK CORPORATION, Tokyo (JP)

(72) Inventors: Takekazu Yamane, Tokyo (JP);
Tetsuya Shibata, Tokyo (JP); Tomohito Mizuno, Tokyo (JP); Hideaki Fukuzawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 18/190,336

(22) Filed: Mar. 27, 2023

(65) Prior Publication Data
US 2023/0304855 A1    Sep. 28, 2023

(30) Foreign Application Priority Data

Mar. 28, 2022    (JP) .................... 2022-051611
Nov. 11, 2022    (JP) .................... 2022-180946

(51) Int. Cl.
    *G01J 1/42*         (2006.01)
(52) U.S. Cl.
    CPC ...................... *G01J 1/42* (2013.01)
(58) Field of Classification Search
    CPC ....... G01R 33/093; G01R 33/096; G01J 1/06; G01J 1/42
    See application file for complete search history.

(56) References Cited

U.S. PATENT DOCUMENTS

| 6,925,261 | B2 | 8/2005 | Haruyama |
| 9,842,874 | B2 | 12/2017 | Nakata |
| 2001/0040713 | A1 | 11/2001 | Haruyama |
| 2015/0333839 | A1 | 11/2015 | Li et al. |
| 2022/0010423 | A1 | 1/2022 | Suzuki et al. |
| 2022/0068537 | A1 | 3/2022 | Mizuno et al. |
| 2022/0252449 | A1* | 8/2022 | Degawa ............... G01J 1/0488 |
| 2022/0416096 | A1* | 12/2022 | Yamane .............. H01F 10/3254 |

FOREIGN PATENT DOCUMENTS

JP    2001-292107 A    10/2001

OTHER PUBLICATIONS

Chen et al., "All-Optical Switching of Magnetic Tunnel Junctions with Single Subpicosecond Laser Pulses," Physical Review Applied, 2017, vol. 7, pp. 021001-1-021001-6.
Al Azim et al., "Optical Receiver With Helicity-Dependent Magnetization Reversal," IEEE Transactions on magnetics, Jan. 2019, vol. 55, No. 1, 4400206.

* cited by examiner

*Primary Examiner* — Kevin K Pyo
(74) *Attorney, Agent, or Firm* — Oliff PLC

(57) ABSTRACT

An optical device includes a magnetic element and a light application part, wherein the light application part configured to apply light to the magnetic element, the magnetic element includes a first ferromagnetic layer to which the light is applied, a second ferromagnetic layer, and a spacer layer sandwiched between the first ferromagnetic layer and the second ferromagnetic layer, and magnetization of the first ferromagnetic layer is inclined with respect to both an in-plane direction in which the first ferromagnetic layer extends and a surface-perpendicular direction perpendicular to a surface on which the first ferromagnetic layer extends in a state in which the light is not applied from the light application part to the magnetic element.

8 Claims, 21 Drawing Sheets

OPTICAL DEVICE

CROSS-REFERENCES TO RELATED APPLICATIONS

This application relies for priority upon Japanese Patent Application No. 2022-051611 filed on Mar. 28, 2022, and Japanese Patent Application No. 2022-180946 filed on Nov. 11, 2022, the entire contents of which are hereby incorporated herein by reference for all purposes as if fully set forth herein.

BACKGROUND

The present disclosure relates to an optical device.

Photoelectric conversion elements are used for various purposes.

For example, Patent Document 1 discloses a receiving device configured to receive an optical signal using a photo diode. The photo diode is, for example, a p-n junction diode or the like using a p-n junction of a semiconductor, which converts light into an electric signal.

In addition, for example, Patent Document 2 discloses a light sensor using a p-n junction of a semiconductor and an image sensor using the light sensor.

Patent Documents

[Patent Document 1]
Japanese Unexamined Patent Application, First Publication No. 2001-292107
[Patent Document 2]
U.S. Pat. No. 9,842,874

SUMMARY

While an optical device using the p-n junction of the semiconductor is widely used, a new optical device is required for further development. In addition, an optical device capable of detecting intensity of applied light over a wide intensity range is required.

It is desirable to provide a new optical device capable of detecting intensity of light throughout a wide intensity range.

The following means are provided.

An optical device according to a first aspect includes a magnetic element and a light application part, the light application part configured to apply light to the magnetic element, the magnetic element includes a first ferromagnetic layer to which the light is applied, a second ferromagnetic layer, and a spacer layer sandwiched between the first ferromagnetic layer and the second ferromagnetic layer, and magnetization of the first ferromagnetic layer is inclined with respect to both an in-plane direction in which the first ferromagnetic layer extends and a surface-perpendicular direction perpendicular to a surface on which the first ferromagnetic layer extends in a state in which the light is not applied from the light application part to the magnetic element.

An optical device according to a second aspect includes a magnetic element and a light application part, wherein the light application part is configured to apply light to the magnetic element, the magnetic element includes a first ferromagnetic layer to which the light is applied, a second ferromagnetic layer, and a spacer layer sandwiched between the first ferromagnetic layer and the second ferromagnetic layer, and an RH curve showing a resistance change of the magnetic element with respect to an external magnetic field applied to the optical device shows no hysteresis in at least a range of an external magnetic field strength including zero in a state in which the light is not applied from the light application part to the magnetic element.

An optical device according to a third aspect includes a magnetic element and a light application part, where in the light application part is configured to apply light to the magnetic element, the magnetic element includes a first ferromagnetic layer to which the light is applied, a second ferromagnetic layer, and a spacer layer sandwiched between the first ferromagnetic layer and the second ferromagnetic layer, and a magnetic domain structure of the first ferromagnetic layer is a vortex structure in a state in which the light is not applied from the light application part to the magnetic element.

DETAILED DESCRIPTION

Figure 1:
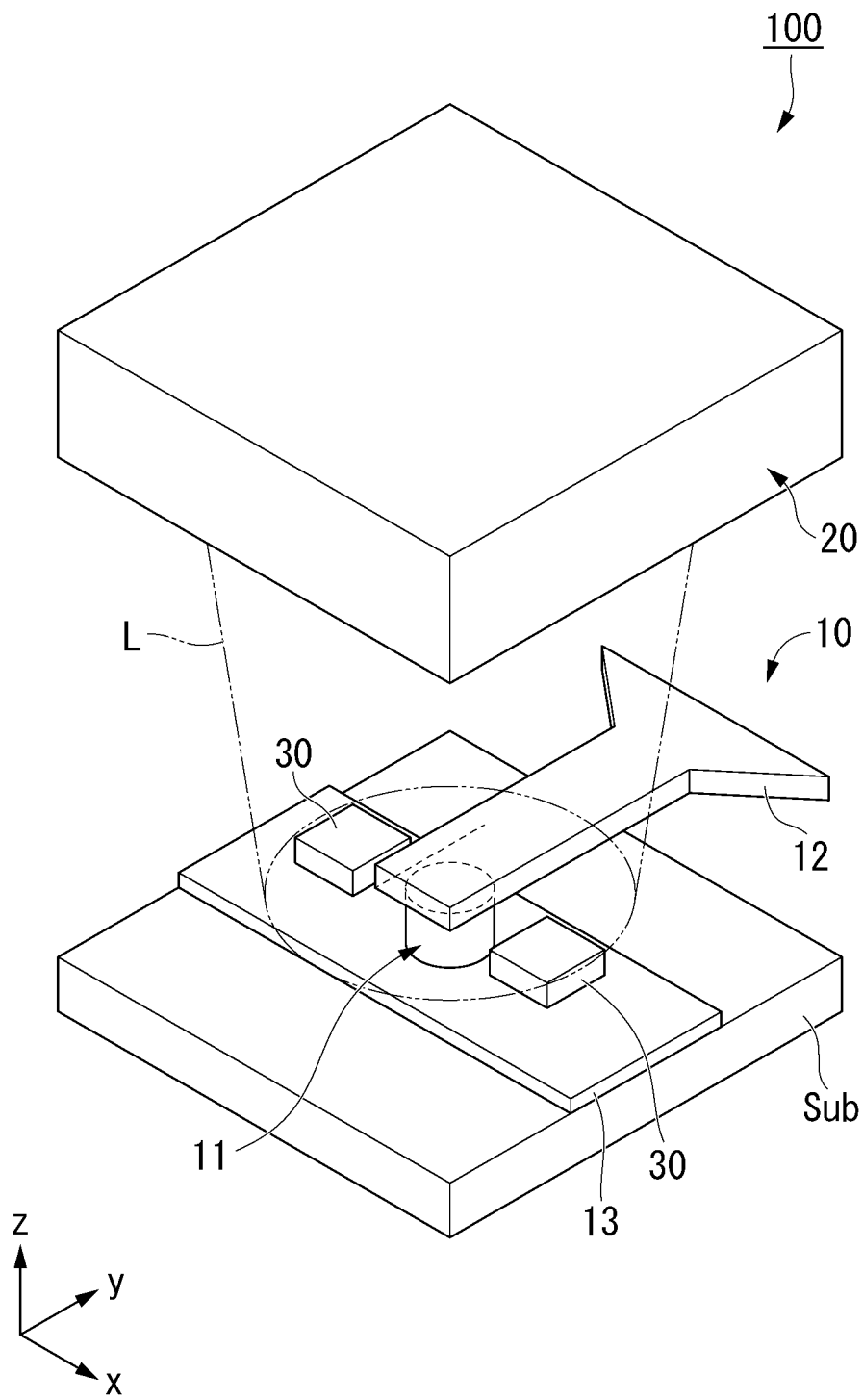
FIG. 1 is a perspective view of an optical device according to a first embodiment.

Hereinafter, embodiments will be described in detail with reference to the accompanying drawings. In the drawings used in the following description, feature parts may be enlarged for convenience in order to make the features easier to understand, and a dimensional ratio or the like of each component may differ from the actual one. Materials, dimensions, or the like, exemplified in the following description are examples, and the present disclosure is not limited to them and it is possible to change them appropriately within the range where the effect of the present disclosure is exhibited.

The optical device according to the presend disclosure can be operated on a new principle and detect intensity of light over a wide intensity range.

Directions will be defined below. One direction of an in-plane direction in which a first ferromagnetic layer 1 of a magnetic element 11 expands is referred to as an x direction, and a direction perpendicular to the x direction in a surface is referred to as a y direction. In addition, a surface-perpendicular direction perpendicular to a surface (xy plane) in which the first ferromagnetic layer 1 expands is referred to as a z direction. The z direction is perpendicular to the x direction and the y direction. Hereinafter, a +z direction may be expressed as "upward" and a −z direction may be expressed as "downward." The +z direction is a direction from a second electrode 13 toward a first electrode 12. Upward and downward do not necessarily match the direction in which the gravity is applied.

First Embodiment

FIG. 1 is a perspective view of an optical device 100 according to a first embodiment. The optical device 100 includes, for example, a light detection element 10 and a light application part 20. The optical device 100 replaces a state of light L applied from the light application part 20 or a change of the state with an electric signal at the light detection element 10.

The light application part 20 applies light L to the magnetic element 11. The light application part 20 has at least one of, for example, a light source and an optical member. The light source is, for example, a laser diode, an LED, or the like. The optical member is, for example, a lens, a meta-lens, a wavelength filter, a waveguide, an optical fiber, a reflector, or the like. For example, light L emitted from the light source and passing through the optical member or reflected by the optical member is applied to the magnetic element 11. The light application part 20 has the optical member and may not include the light source, and the light from the outside of the optical device 100 may be applied to the magnetic element 11 after passing through the optical member or being reflected by the optical member as the light application part 20. The light application part 20 has the light source and may not include the optical member, and the light emitted from the light source provided in the light application part 20 may be applied to the magnetic element 11 without passing through the above-mentioned optical member. The light L is, for example, monochromatic light with a single wavelength such as a laser beam or the like. The light L may not be the monochromatic light, may be light whose wavelength is limited to a range with a certain width, or may be light with a continuous spectrum.

The light L is not limited to visible light, and also includes infrared light with a longer wavelength than visible light or ultraviolet light with a shorter wavelength than visible light. The wavelength of visible light is, for example, 380 nm or more and less than 800 nm. The wavelength of infrared light is, for example, 800 nm or more and 1 mm or less. The wavelength of ultraviolet light is, for example, 200 nm or more and less than 380 nm. The light L is, for example, light that contains a radio frequency optical signal and changes in intensity, or light whose wavelength region is controlled (for example, light passing through a wavelength filter). The radio frequency optical signal is, for example, a signal with a frequency of 100 MHz or more.

The light detection element 10 is formed on, for example, a substrate Sub. The light detection element 10 includes, for example, the magnetic element 11, the first electrode 12, the second electrode 13, and a magnetic field application part 30.

Figure 2:
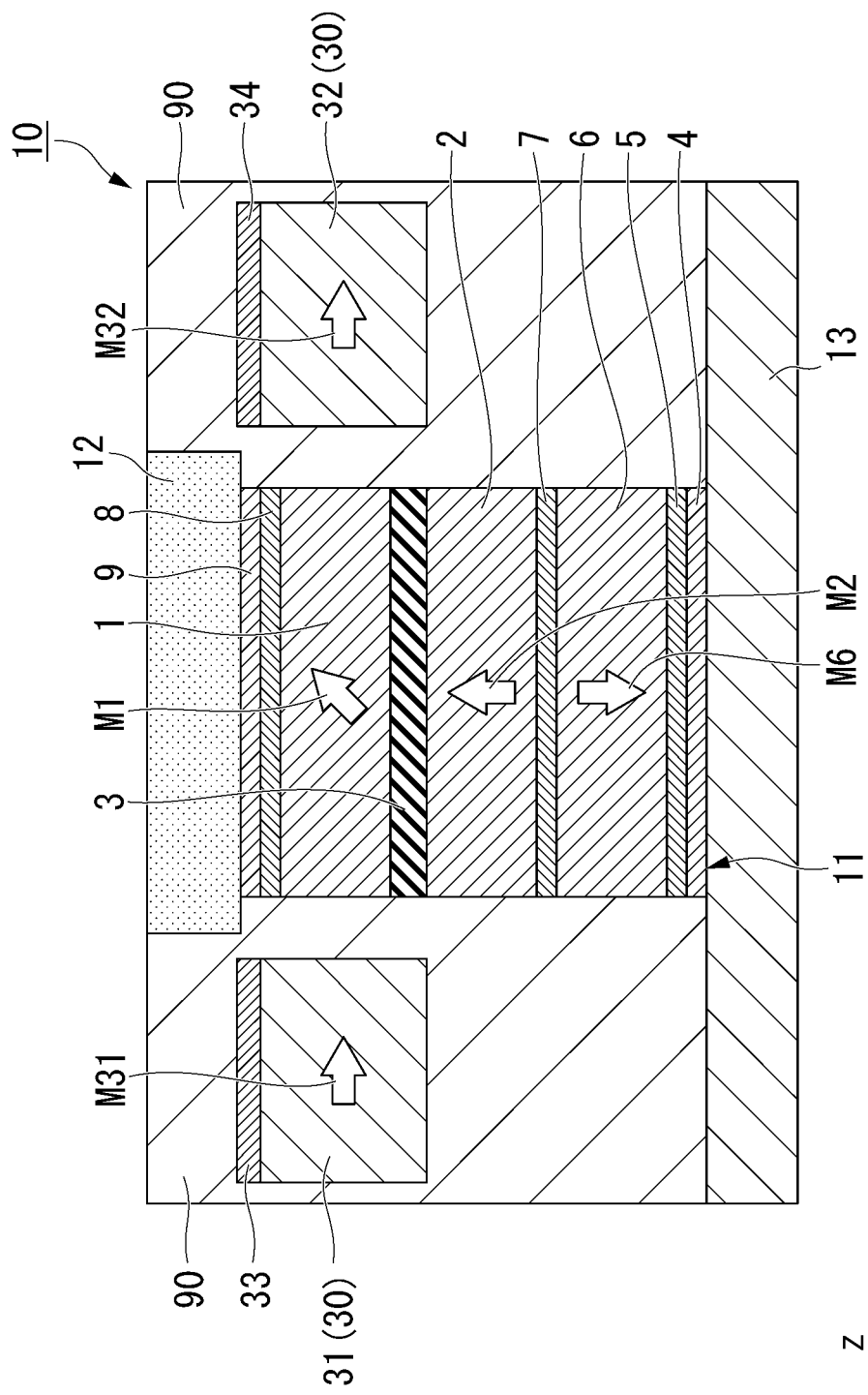
FIG. 2 is a cross-sectional view of a light detection element according to the first embodiment.

FIG. 2 is a cross-sectional view of the light detection element 10 according to the first embodiment. In FIG. 2, an orientation of magnetization of a ferromagnetic material in a state in which light L is not applied from the light application part 20 to the magnetic element 11 is expressed as an arrow. The first electrode 12 and the second electrode 13 sandwich the magnetic element 11 in the z direction. The magnetic field application part 30 is located to sandwich the magnetic element 11 in the x direction, for example. Surroundings of the magnetic element 11 and the magnetic field application part 30 are covered with an insulating layer 90.

The insulating layer 90 is, for example, an oxide, nitride or oxynitride of Si, Al or Mg. The insulating layer 90 is, for example, silicon oxide ($SiO_x$), silicon nitride ($SiN_x$), silicon carbide (SiC), chromium nitride, carbon silicon nitride (SiCN), silicon oxynitride (SiON), aluminum oxide ($Al_2O_3$), zirconium oxide ($ZrO_x$), or the like.

The magnetic element 11 has at least the first ferromagnetic layer 1, a second ferromagnetic layer 2 and a spacer layer 3. The spacer layer 3 is located between the first ferromagnetic layer 1 and the second ferromagnetic layer 2. In addition, the magnetic element 11 may have a buffer layer 4, a seed layer 5, a ferromagnetic layer 6, a magnetic coupling layer 7, a vertical magnetization induction layer 8 and a cap layer 9. The buffer layer 4, the seed layer 5, the ferromagnetic layer 6 and the magnetic coupling layer 7 are located between the second ferromagnetic layer 2 and the second electrode 13, and the vertical magnetization induction layer 8 and the cap layer 9 are located between the first ferromagnetic layer 1 and the first electrode 12. For example, the magnetic element 11 has a columnar shape, and a shape when seen in a plan view in the z direction is a circular shape.

The magnetic element 11 is, for example, a magnetic tunnel junction (MTJ) element in which the spacer layer 3 is constituted by an insulating layer. A resistance value of the magnetic element 11 changes when light from the outside is applied. A resistance value of the magnetic element 11 in the z direction (a resistance value when current flows in the z direction) changes according to a relative change between a state of magnetization M1 of the first ferromagnetic layer 1 and a state of magnetization M2 of the second ferromagnetic layer 2. Such an element is also referred to as a magnetoresistance effect element.

The first ferromagnetic layer 1 is a light detection layer of which a state of magnetization changes when light L is applied. The first ferromagnetic layer 1 is also referred to as a magnetization free layer. The magnetization free layer is a layer containing a magnetic material of which a state of magnetization changes when energy from a predetermined outside source is applied. The energy from the predetermined outside source is, for example, light applied from the outside, current flowing in a laminating direction of the magnetic element 11, or a magnetic field applied from the outside of the first ferromagnetic layer 1. The state of the magnetization M1 of the first ferromagnetic layer 1 changes according to intensity of the applied light L.

The magnetization M1 of the first ferromagnetic layer 1 is also inclined with respect to any one of the in-plane direction and the surface-perpendicular direction in a state in which light L is not applied from the light application part 20 to the magnetic element 11. In a state in which the light L is not applied to the magnetic element 11, when the magnetization M1 is also inclined with respect to any one of the in-plane direction and the surface-perpendicular direction, an RH curve shows no hysteresis. The RH curve shows a resistance change of the magnetic element 11 with respect to an external magnetic field applied to the optical device 100. Here, the external magnetic field is a magnetic field applied from the outside of the optical device 100. The magnetization M1 of the first ferromagnetic layer 1 is inclined with respect to, for example, any direction in the xy plane and the z direction in a state in which the light L is not applied from the light application part 20 to the magnetic element 11.

The first ferromagnetic layer 1 is, for example, a vertical magnetization film having a magnetization easy axis in the surface-perpendicular direction (z direction). The magnetization M1 of the first ferromagnetic layer 1 is inclined in any direction (for example, in the x direction) from the surface-perpendicular direction to the in-plane direction by applying the magnetic field with a component in the in-plane direction from the magnetic field application part 30, which will be described below. Here, the magnetic field applied from the magnetic field application part 30 to the first ferromagnetic layer 1 is a magnetic field generated in the optical device 100, which is discriminated from the external magnetic field applied from the outside of the optical device 100 and is not included in the external magnetic field applied from the outside of the optical device 100.

The first ferromagnetic layer 1 includes a ferromagnetic material. The first ferromagnetic layer 1 also includes at least one of magnetic elements such as Co, Fe, Ni, and the like. The first ferromagnetic layer 1 may include elements such as B, Mg, Hf, Gd, and the like, together with the above-mentioned magnetic element. The first ferromagnetic layer 1 may be, for example, an alloy containing a magnetic element and a non-magnetic element. The first ferromagnetic layer 1 may be constituted by a plurality of layers. The first ferromagnetic layer 1 is, for example, a CoFeB alloy, a laminated body in which a CoFeB alloy layer is sandwiched between Fe layers, and a laminated body in which a CoFeB alloy layer is sandwiched between CoFe layers.

In addition, the first ferromagnetic layer 1 may be a laminated body in which magnetic layers and non-magnetic layers are laminated alternately, or for example, may be a laminated body in which Co and Pt are laminated alternately or a laminated body in which Co and Ni are laminated alternately. In general, "ferromagnetism" includes "ferrimagnetism." The first ferromagnetic layer 1 may exhibit ferrimagnetism. Meanwhile, the first ferromagnetic layer 1 may exhibit ferromagnetism that is not ferrimagnetism. For example, the CoFeB alloy may exhibit ferromagnetism that is not ferrimagnetism.

A film thickness of the first ferromagnetic layer 1 is, for example, 1 nm or more and 5 nm or less. A film thickness of the first ferromagnetic layer 1 may be, for example, 1 nm or more and 2 nm or less. When the first ferromagnetic layer 1 is a vertical magnetization film, if the film thickness of the first ferromagnetic layer 1 is small, a vertical magnetic anisotropic applying effect from layers above and below the first ferromagnetic layer 1 is strengthened, and vertical magnetic anisotropy of the first ferromagnetic layer 1 increases. That is, when the vertical magnetic anisotropy of the first ferromagnetic layer 1 is high, a force of the magnetization trying to return to the z direction is strengthened. Meanwhile, when the film thickness of the first ferromagnetic layer 1 is increased, the vertical magnetic anisotropic applying effect from the layers above and below the first ferromagnetic layer 1 is relatively weakened, and the vertical magnetic anisotropy of the first ferromagnetic layer 1 is weakened.

A volume of the ferromagnetic material decreases when the film thickness of the first ferromagnetic layer 1 is thinned, and the volume of the ferromagnetic material increases when the film thickness is thickened. The ease of a magnetization reaction of the first ferromagnetic layer 1 when energy from the outside is applied is inversely proportional to a product (KuV) of a magnetic anisotropy (Ku) and a volume (V) of the first ferromagnetic layer 1. That is, when the product of the magnetic anisotropy and the volume of the first ferromagnetic layer 1 decreases, reactivity with respect to the light increases. From this point of view, in order to increase the reaction with respect to the light, the magnetic anisotropy of the first ferromagnetic layer 1 may be appropriately designed and then the volume of the first ferromagnetic layer 1 may be reduced.

When the film thickness of the first ferromagnetic layer 1 is greater than 2 nm, for example, the insertion layer formed of Mo and W may be provided in the first ferromagnetic layer 1. That is, the laminated body in which the ferromagnetic layer, the insertion layer and the ferromagnetic layer are laminated in sequence in the z direction may be provided as the first ferromagnetic layer 1. The vertical magnetic anisotropy of the first ferromagnetic layer 1 increases as a whole due to the interface magnetic anisotropy in the interface between the insertion layer and the ferromagnetic layer. The film thickness of the insertion layer is, for example, 0.1 nm to 0.6 nm.

The second ferromagnetic layer 2 is a magnetization fixing layer. The magnetization fixing layer is a layer formed of a magnetic material whose state of magnetization is less likely to change than the magnetization free layer when energy from the predetermined outside source is applied. For example, in the magnetization fixing layer, an orientation of the magnetization is less likely to change than in the magnetization free layer when energy from the predetermined outside source is applied. In addition, for example, in the magnetization fixing layer, a magnitude of the magnetization is less likely to change than in the magnetization free layer when energy from the predetermined outside source is applied. For example, a coercive force of the second ferromagnetic layer 2 is greater than a coercive force of the first ferromagnetic layer 1. The second ferromagnetic layer 2 may be an in-plane magnetization film or may be a vertical magnetization film. In the example shown in FIG. 2, a direction of the magnetization M2 of the second ferromagnetic layer 2 is a z direction.

For example, a material that composes the second ferromagnetic layer 2 is the same as in the first ferromagnetic layer 1. The second ferromagnetic layer 2 may be, for example, a multi-layered film in which Co with a thickness of 0.4 nm to 1.0 nm and Pt with a thickness of 0.4 nm to 1.0 nm are alternately laminated a plurality of times. The second ferromagnetic layer 2 may be, for example, a laminated body in which Co with a thickness of 0.4 nm to 1.0 nm, Mo with a thickness of 0.1 nm to 0.5 nm, a CoFeB alloy with a thickness of 0.3 nm to 1.0 nm, and Fe with a thickness of 0.3 nm to 1.0 nm are laminated in sequence.

For example, the magnetization M2 of the second ferromagnetic layer 2 may be fixed by magnetic coupling to the ferromagnetic layer 6 with the magnetic coupling layer 7 sandwiched therebetween. In this case, a combination of the second ferromagnetic layer 2, the magnetic coupling layer 7 and the ferromagnetic layer 6 may be referred to as a magnetization fixing layer. Details of the magnetic coupling layer 7 and the ferromagnetic layer 6 will be described below.

The spacer layer 3 is a layer disposed between the first ferromagnetic layer 1 and the second ferromagnetic layer 2. The spacer layer 3 is constituted by a layer composed of a conducting material, an insulating material or a semiconductor, or a layer including an electric conduction point and composed of a conductor in an insulating material. The spacer layer 3 is, for example, a non-magnetic layer. A film thickness of the spacer layer 3 can be adjusted according to the orientation directions of the magnetization M1 of the first ferromagnetic layer 1 and the magnetization M2 of the second ferromagnetic layer 2.

For example, when the spacer layer 3 is formed of an insulating material, the magnetic element 11 has a magnetic tunnel junction (MTJ) constituted by the first ferromagnetic layer 1, the spacer layer 3, and the second ferromagnetic layer 2. Such an element is referred to as an MTJ element. In this case, the magnetic element 11 can exhibit a tunnel magnetoresistance (TMR) effect. For example, when the spacer layer 3 is formed of a metal, the magnetic element 11 can exhibit a giant magnetoresistance (GMR) effect. Such an element is referred to as a GMR element. While the magnetic element 11 may be called differently, such as a MTJ element, a GMR element, or the like, due to a constituent material of the spacer layer 3, it may be generally referred to as a magnetoresistance effect element.

When the spacer layer 3 is constituted by an insulating layer, a material including aluminum oxide, magnesium oxide, titanium oxide, silicon oxide, or the like, may be used as a material of the spacer layer 3. In addition, these insulating layers may contain an element such as Al, B, Si, Mg, or the like, or a magnetic element such as Co, Fe, Ni, or the like. A high magnetic resistance changing rate is obtained by adjusting a film thickness of the spacer layer 3 to exhibit a high TMR effect between the first ferromagnetic layer 1 and the second ferromagnetic layer 2. In order to efficiently use the TMR effect, the film thickness of the spacer layer 3 may be about 0.5 to 5.0 nm, or may be about 1.0 to 2.5 nm.

When the spacer layer 3 is formed of a non-magnetic conductive material, a conductive material such as Cu, Ag, Au, Ru, or the like, may be used. In order to efficiently use a GMR effect, the film thickness of the spacer layer 3 may be about 0.5 to 5.0 nm or may be about 2.0 to 3.0 nm.

When the spacer layer 3 is formed of a non-magnetic semiconductor material, a material such as zinc oxide, indium oxide, tin oxide, germanium oxide, gallium oxide, ITO, or the like, may be used. In this case, a film thickness of the spacer layer 3 may be about 1.0 to 4.0 nm.

When a layer including an electric conduction point constituted by a conductor in a non-magnetic insulating material is applied as the spacer layer 3, the layer may have a structure including an electric conduction point constituted by a non-magnetic conductor such as Cu, Au, Al, or the like, in the non-magnetic insulating material composed of aluminum oxide or magnesium oxide. In addition, the conductor may be composed of a magnetic element such as Co, Fe, Ni, or the like. In this case, a film thickness of the spacer layer 3 may be about 1.0 to 2.5 nm. For example, the electric conduction point is a columnar body with a diameter of 1 nm or more and 5 nm or less when seen in a direction perpendicular to the film surface.

The ferromagnetic layer 6 is magnetically coupled to, for example, the second ferromagnetic layer 2. The magnetic coupling is, for example, anti-ferromagnetical coupling, which is generated by an RKKY interaction. An orientation of the magnetization M2 of the second ferromagnetic layer 2 and an orientation of magnetization M6 of the ferromagnetic layer 6 have an antiparallel relation. The material that forms the ferromagnetic layer 6 is, for example, the same as the first ferromagnetic layer 1.

The magnetic coupling layer 7 is located between the second ferromagnetic layer 2 and the ferromagnetic layer 6. The magnetic coupling layer 7 is, for example, Ru, Ir, or the like.

The buffer layer 4 is a layer that attenuates a lattice mismatch between different crystals. The buffer layer 4 is formed of, for example, a metal containing at least one element selected from the group consisting of Ta, Ti, Zr and Cr, or nitride containing at least one element selected from the group consisting of Ta, Ti, Zr and Cu. More specifically, the buffer layer 4 is formed of, for example, Ta (simple substance), NiCr alloy, TaN (tantalum nitride), and CuN (copper nitride). A film thickness of the buffer layer 4 is, for example, 1 nm or more and 5 nm or less. The buffer layer 4 is, for example, amorphous. The buffer layer 4 is located, for example, between the seed layer 5 and the second electrode 13, and in contact with the second electrode 13. The buffer layer 4 suppresses the crystal structure of the second electrode 13 from affecting the crystal structure of the second ferromagnetic layer 2.

The seed layer 5 increases crystallinity of a layer laminated on the seed layer 5. For example, the seed layer 5 is located on the buffer layer 4 between the buffer layer 4 and the ferromagnetic layer 6. The seed layer 5 is, for example, Pt, Ru, Zr, or NiFeCr. A film thickness of the seed layer 5 is, for example, 1 nm or more and 5 nm or less.

The cap layer 9 is located between the first ferromagnetic layer 1 and the first electrode 12. The cap layer 9 may be laminated on the first ferromagnetic layer 1 and include the vertical magnetization induction layer 8 in contact with the first ferromagnetic layer 1. The cap layer 9 prevents damage to the lower layer during a treatment process, and increases the crystallinity of the lower layer during annealing. A film thickness of the cap layer 9 is, for example, 10 nm or less such that a sufficient amount of light is applied to the first ferromagnetic layer 1.

The vertical magnetization induction layer 8 induces vertical magnetic anisotropy of the first ferromagnetic layer 1. The vertical magnetization induction layer 8 is formed of, for example, magnesium oxide, W, Ta, Mo, or the like. When the vertical magnetization induction layer 8 is formed of magnesium oxide, in order to increase conductivity, the magnesium oxide may be oxygen deficient. A film thickness of the vertical magnetization induction layer 8 is, for example, 0.5 nm or more and 5.0 nm or less.

The first electrode 12 is disposed at, for example, a side where light is applied to the magnetic element 11. The light L is applied from the side of the first electrode 12 to the magnetic element 11, and applied to at least the first ferromagnetic layer 1. The first electrode 12 is formed of a material having conductivity. The first electrode 12 is, for example, a transparent electrode having permeability with respect to light in a use wavelength region. For example, the first electrode 12 may transmit 80% or more of the light in the use wavelength region.

The first electrode 12 is an oxide such as indium tin oxide (ITO), indium zinc oxide (IZO), zinc oxide (ZnO), indium gallium zinc oxide (IGZO), or the like. The first electrode 12 may be configured to have a plurality of columnar metals in the transparent electrode material of these oxides. It is not essential to use the above-mentioned transparent electrode material for the first electrode 12, and the applied light may reach the first ferromagnetic layer 1 by using the metal material such as Au, Cu, Al, or the like, with a small film thickness. When a metal is used as a material of the first electrode 12, a film thickness of the first electrode 12 is, for example, 3 to 10 nm. In addition, the first electrode 12 may have an antireflection film on an irradiation surface to which light is applied.

The second electrode 13 is opposite to the first electrode 12 with the magnetic element 11 sandwiched therebetween. The second electrode 13 is formed of a material having conductivity. The second electrode 13 is formed of a metal such as Cu, Al, Au, or the like. Ta or Ti may be laminated above and below these metals. In addition, a laminated film of Cu and Ta, a laminated film of Ta, Cu and Ti, and a laminated film of Ta, Cu and TaN may also be used. In addition, TiN or TaN may be used as the second electrode 13. A film thickness of the second electrode 13 is, for example, 200 nm to 800 nm.

The second electrode 13 may have permeability with respect to the light applied to the magnetic element 11. Like the first electrode 12, for example, a transparent electrode material of an oxide such as indium tin oxide (ITO), indium zinc oxide (IZO), zinc oxide (ZnO), indium gallium zinc oxide (IGZO), or the like, may be used as the material of the second electrode 13. Even when the light L is applied from the side of the first electrode 12, while the light may reach the second electrode 13 depending on the intensity of the light L, in this case, since the second electrode 13 is composed of a transparent electrode material of an oxide, reflection of the light in the interface between the second electrode 13 and the layer in contact therewith can be suppressed as compared with the case where the second electrode 13 is formed of a metal.

The magnetic field application part 30 applies a magnetic field to the first ferromagnetic layer 1. The magnetic field application part 30 is located not to block the light applied from the light application part 20 to the magnetic element 11. For example, the magnetic field application part 30 is located not to interest a line segment that connects the light emission end of the light application part 20 and the magnetic element 11.

The magnetic field application part 30 has, for example, a first ferromagnetic layer 31 and a second ferromagnetic layer 32. A first light shielding layer 33 is provided on one surface of the first ferromagnetic layer 31. A second light shielding layer 34 is provided on one surface of the second ferromagnetic layer 32.

The first ferromagnetic layer 31 and the second ferromagnetic layer 32 each is located at a position overlapping the first ferromagnetic layer 1 when seen in any one direction perpendicular to the z direction. The first ferromagnetic layer 31 and the second ferromagnetic layer 32 sandwich the first ferromagnetic layer 1 in any one direction (for example, the x direction) of the in-plane direction via, for example, the insulating layer 90.

The first ferromagnetic layer 31 and the second ferromagnetic layer 32 are formed of a ferromagnetic material. The first ferromagnetic layer 31 and the second ferromagnetic layer 32 are in-plane magnetization films having a magnetization easy axis in the in-plane direction. Magnetization M31 of the first ferromagnetic layer 31 and magnetization M32 of the second ferromagnetic layer 32 are oriented, for example, in the x direction.

A magnetostatic leakage field generated between the first ferromagnetic layer 31 and the second ferromagnetic layer 32 is applied to the first ferromagnetic layer 1 as a bias magnetic field. The bias magnetic field is applied to the magnetization M1, and the magnetization M1 is also inclined to any one of the –plane direction and the surface-perpendicular direction.

In the magnetic field application part 30, the light L from the light application part 20 is not applied by the first light shielding layer 33 and the second light shielding layer 34. The first light shielding layer 33 prevents the light L from being applied to the first ferromagnetic layer 31. The second light shielding layer 34 prevents the light L from being applied to the second ferromagnetic layer 32. By preventing the light L from being applied to the magnetic field application part 30, a change in the state of the light L can suppress a change in the magnetization state of the first ferromagnetic layer 31 and the second ferromagnetic layer 32. The first light shielding layer 33 and the second light shielding layer 34 are formed of, for example, tungsten, tantalum, titanium, or the like.

The first light shielding layer 33 and the second light shielding layer 34 may be omitted when light L is not applied to the magnetic field application part 30. For example, when the magnetic field application part 30 is sufficiently separated from the magnetic element 11 or when light L is focused toward the magnetic element 11 by a lens or the like, the light L is not applied to the magnetic field application part 30.

Figure 3:
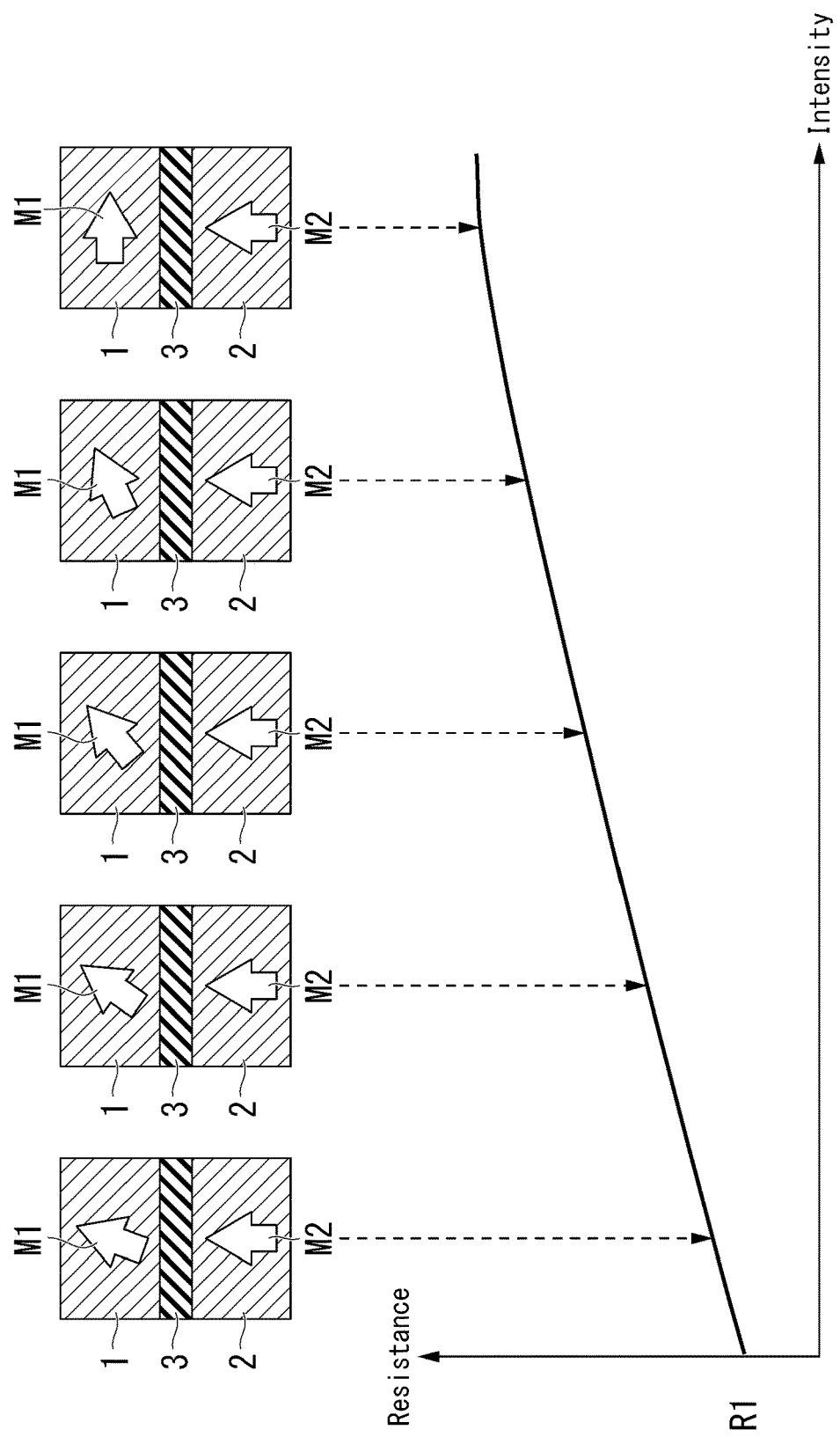
FIG. 3 is a view showing a relation between a change in intensity of light applied to a magnetic element according to the first embodiment and a resistance value of the magnetic element.

Next, a mechanism of an operation of the magnetic element 11 will be described. FIG. 3 is a view showing a relation between an intensity change of light L applied to the magnetic element 11 and a resistance value of the magnetic element 11 according to the first embodiment. A lateral axis of FIG. 3 indicates intensity of the light L applied to the magnetic element 11, and a longitudinal axis indicates a resistance value of the magnetic element 11.

An output voltage from the magnetic element 11 is changed according to the intensity change of the light L applied to the first ferromagnetic layer 1. Contribution to the change of the output voltage of the magnetic element 11 is a change in resistance value of the magnetic element 11 in the laminating direction.

The magnetic element 11 shows a first resistance value R1 in a state in which light L from the light application part 20 is not applied to the magnetic element 11 (hereinafter, referred to as an initial state). A resistance value of the magnetic element 11 in the z direction is obtained using the Ohm's law form a voltage value obtained by flowing sense current in the z direction of the magnetic element 11 and generating a voltage at both ends of the magnetic element 11 in the z direction. The output voltage from the magnetic element 11 is generated between the first electrode 12 and the second electrode 13. In the initial state, the output voltage output from the magnetic element 11 indicates a first value.

When light L is applied to the first ferromagnetic layer 1, the magnetization M1 of the first ferromagnetic layer 1 is inclined from the initial state by energy from the outside due to application of the light L. In addition, when the intensity of the light L applied to the first ferromagnetic layer 1 is changed, a degree of inclination of the magnetization M1 of the first ferromagnetic layer 1 is changed according to the intensity of the light L. The inclination of the first ferromagnetic layer 1 with respect to the initial state of the magnetization M1 is increased as the intensity of the light L applied to the first ferromagnetic layer 1 is increased. For example, an angle between the direction of the magnetization M1 of the first ferromagnetic layer 1 in the initial state and the direction of the magnetization M1 in a state in which the light L is applied is greater than 0° and smaller than 90°.

When the magnetization M1 of the first ferromagnetic layer 1 is inclined from the initial state, the resistance value of the magnetic element 11 in the z direction is changed from the initial state. For example, the resistance value of the magnetic element 11 in the z direction is gradually increased according to the inclination of the magnetization M1 of the first ferromagnetic layer 1. When the resistance value of the magnetic element 11 in the z direction is changed, the output voltage or the output current from the magnetic element 11 is changed. For example, the output voltage from the magnetic element 11 is increased as the resistance value of the magnetic element 11 is increased. In addition, when the magnetic element 11 is connected to a constant voltage source, the output current from the magnetic element 11 is reduced as the resistance value of the magnetic element 11 is increased.

When the intensity of the light L applied to the magnetic element 11 is changed, the output voltage or the output current from the magnetic element 11 (the resistance value of the magnetic element 11 in the laminating direction) is changed. Accordingly, the magnetic element 11 can detect the intensity of the light L as the output voltage or the output current from the magnetic element 11 (the resistance value of the magnetic element 11).

Since a spin transfer torque in the same direction as the magnetization M2 of the second ferromagnetic layer 2 is applied to the magnetization M1 of the first ferromagnetic layer 1, when the light L is not applied to the magnetic element 11 from the light application part 20, the magnetization M1 of the magnetic element 11 returns to the initial state. When the magnetization M1 returns to the initial state, the resistance value of the magnetic element 11 in the laminating direction returns to the first resistance value R1, and the output voltage or the output current from the magnetic element 11 returns to the first value.

The output voltage from the magnetic element 11 can be changed to correspond to the change in intensity of the light L applied to the first ferromagnetic layer 1, and the magnetic element 11 can convert the change in intensity of the applied light L into the change in output voltage from the magnetic element 11. That is, the magnetic element 11 can replace the light with an electric signal.

Figure 4:
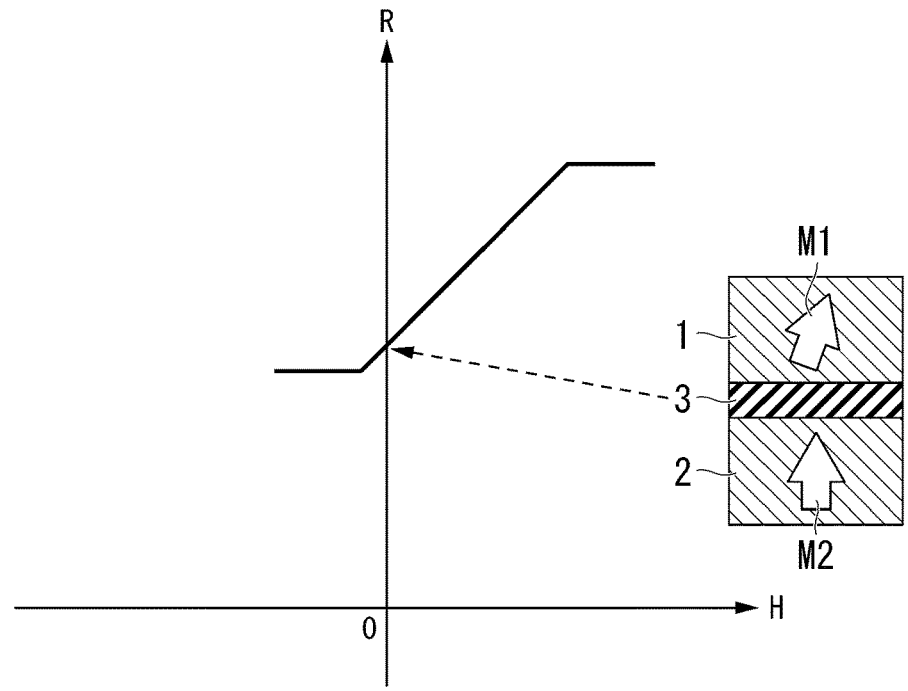
FIG. 4 is a view showing an RH curve of the magnetic element according to the first embodiment.

FIG. 4 is a view showing an RH curve (hereinafter, also referred to as "an RH curve of the magnetic element 11) showing a resistance change of the magnetic element 11 with respect to an external magnetic field applied in a direction (in the example, the z direction) of the magnetization M2 of the second ferromagnetic layer 2 with respect to the optical device 100 according to the first embodiment. In the graph shown in FIG. 4, the external magnetic field expressed as H is expressed such that the external magnetic field in the +z direction shown in FIG. 2 has a negative sign.

In a state in which light L is not applied from the light application part 20 to the magnetic element 11, since the magnetization M1 of the first ferromagnetic layer 1 is inclined with respect to the in-plane direction and the surface-perpendicular direction, the RH curve of the magnetic element 11 does not show the hysteresis. That is, a state of the magnetization M1 of the first ferromagnetic layer 1 of the magnetic element 11 (a direction of the magnetization M1) is changed according to a magnitude of an external magnetic field over a wide range of the magnitude of the external magnetic field. While application of the external magnetic field to the optical device 100 is an example of application of the energy to the magnetic element 11 from the outside, application of the light L to the magnetic element 11 is also similar application of the energy from the outside. For this reason, a state of the magnetization M1 of the first ferromagnetic layer 1 of the magnetic element 11 (a direction of the magnetization M1) is changed according to the intensity change of the light L over a wide intensity range of the light L. Accordingly, as shown in FIG. 3, the output voltage or the output current from the magnetic element 11 (the resistance value of the magnetic element 11) is continuously changed according to the intensity change of the light L over the wide intensity range of the light L.

Figure 5:
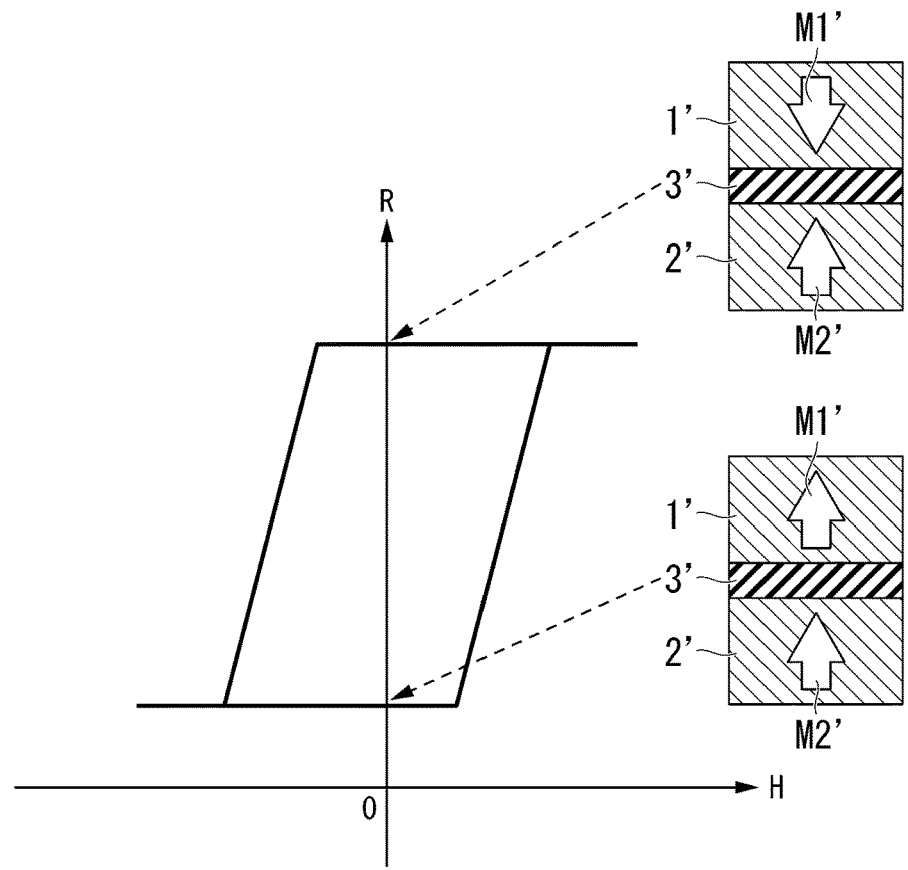
FIG. 5 is a view showing an RH curve of a magnetic element according to a comparative example.

FIG. 5 is a view showing an RH curve of a magnetic element according to a comparative example (an RH curve showing a resistance change of a magnetic element according to a comparative example with respect to an external magnetic field in the z direction applied to the optical device according to the comparative example). In the graph shown in FIG. 5, the external magnetic field expressed as H is expressed such that an external magnetic field in an upward direction (a magnetization direction of a magnetization M2') in a schematic view of the magnetic element in FIG. 5 has a negative sign. A magnetic element according to the comparative example is the same as the magnetic element 11 according to the first embodiment except that the magnetization M1 of the first ferromagnetic layer 1 is oriented in the z direction in a state in which the light L is not applied to the magnetic element according to the comparative example. The magnetic element according to the comparative example includes a first ferromagnetic layer 1', a second ferromagnetic layer 2', and a spacer layer 3' sandwiched therebetween. In the magnetic element according to the comparative example, in a state in which the light L is not applied to the magnetic element according to the comparative example, the magnetization M1' of the first ferromagnetic layer 1' and the magnetization M2' of the second ferromagnetic layer 2' are parallel and antiparallel. As shown in FIG. 5, the magnetization M1' of the first ferromagnetic layer 1' and the magnetization M2' of the second ferromagnetic layer 2' of the magnetic element according to the comparative example are states in which the parallel or antiparallel state is stable. In a state in which the light L is not applied to the magnetic element according to the comparative example, the RH curve of the magnetic element according to the comparative example shows the hysteresis.

Figure 6:
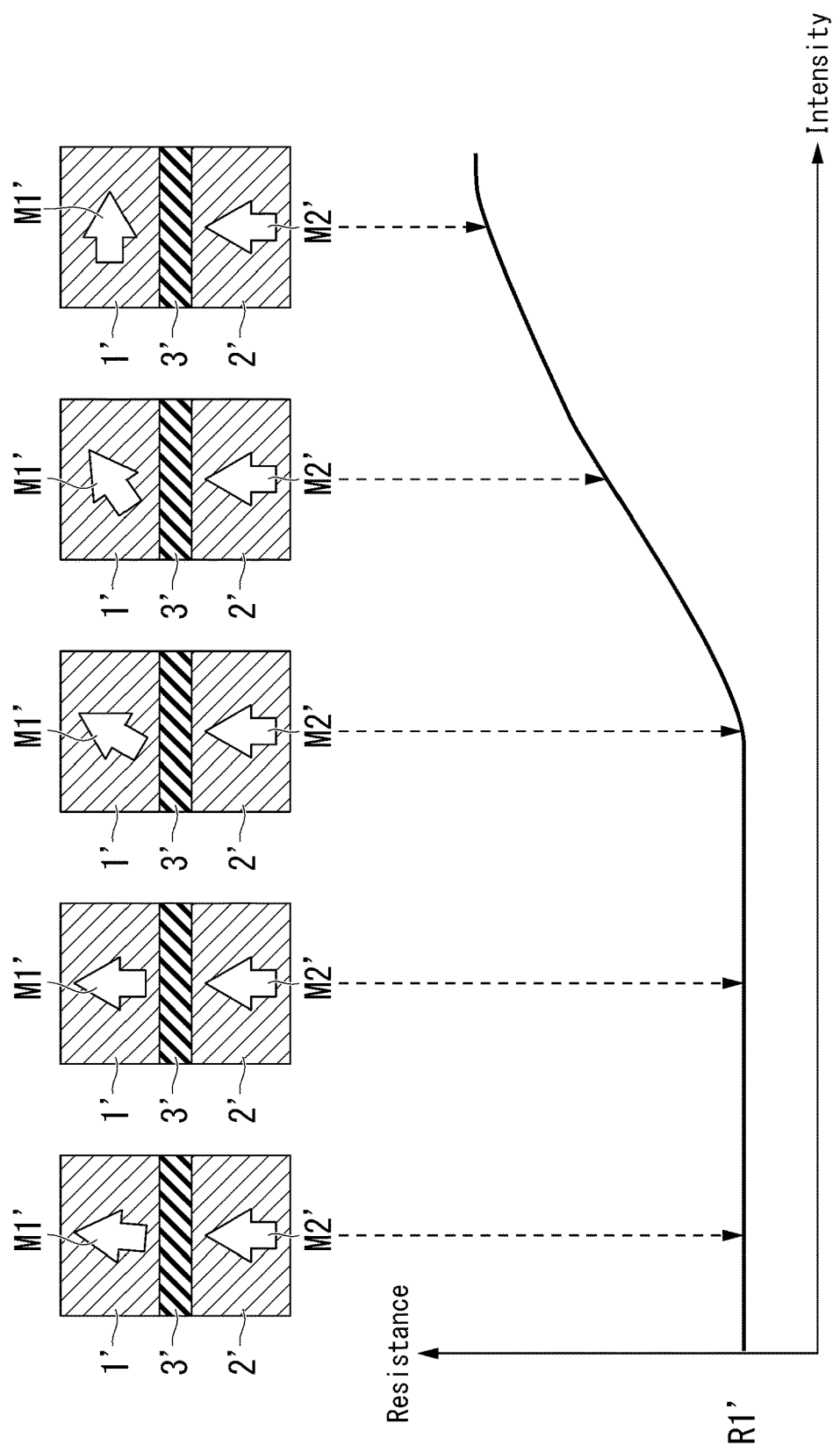
FIG. 6 is a view showing a relation between a change in intensity of light applied to a magnetic element according to the comparative example and a resistance value of the magnetic element according to the comparative example.

FIG. 6 is a view showing a relation between an intensity change of light L applied to a magnetic element according to a comparative example and a resistance value of the magnetic element according to the comparative example. A lateral axis of FIG. 6 is intensity of the light L applied to the magnetic element according to the comparative example, and a longitudinal axis is a resistance value of the magnetic element according to the comparative example.

The magnetic element according to the comparative example shows a first resistance value R1' in a state in which light L from the light application part 20 is not applied to the magnetic element according to the comparative example. In the magnetic element according to the comparative example, in a state in which the light L is not applied to the magnetic element according to the comparative example, the magnetization M1' of the first ferromagnetic layer 1' and the magnetization M2' of the second ferromagnetic layer 2' are stable states. For this reason, when the intensity of the light L applied to the first ferromagnetic layer 1' is reduced and equal to or smaller than a constant threshold, the magnetization M1' of the first ferromagnetic layer 1' is hardly changed. When the light L with intensity exceeding a threshold is applied to the first ferromagnetic layer 1', the magnetization M1' of the first ferromagnetic layer 1' is changed. An inclination of the first ferromagnetic layer 1' with respect to the z direction of the magnetization M1' is increased as the intensity of the light L applied to the first ferromagnetic layer 1' is increased.

For this reason, as shown in FIG. 6, a resistance value of the magnetic element in the z direction shows substantially a constant value (the first resistance value R1') regardless of the intensity of the light L when the intensity of the light L is equal to or smaller than the threshold, and is changed according to the intensity of the light L when the intensity of the light L exceeds the threshold. In addition, the output voltage or the output current from the magnetic element shows substantially a constant value regardless of the intensity of the light L when the intensity of the light L is equal to or smaller than the threshold, and is changed according to the intensity of the light L when the intensity of the light L exceeds the threshold.

In the light detection element 10, an angle between the direction of the magnetization M1 of the first ferromagnetic layer 1 and the surface-perpendicular direction in a state in which the light L is not applied from the light application part 20 to the magnetic element 11 may be, for example, 5° or more, 20° or more, and 35° or more. As a result, even when the intensity of the light L applied to the first ferromagnetic layer 1 is within a small range, the state of the magnetization M1 of the first ferromagnetic layer 1 (a direction of the magnetization M1) is more reliably changed according to the intensity change of the light L, and the output voltage or the output current from the magnetic element 11 (a resistance value of the magnetic element 11) can be more reliably continuously changed according to the intensity change of the light L. In addition, in the light detection element 10, an angle between the direction of the magnetization M1 of the first ferromagnetic layer 1 and the surface-perpendicular direction in a state in which the light L is not applied from the light application part 20 to the magnetic element 11 may be, for example, 85° or less, 70° or less, or 55° or less. As a result, since a movable range of the magnetization M1 with respect to the intensity change of the light L is more reliably secured, a detection range of the intensity of the light L can be more reliably secured.

An angle between the direction of the magnetization M1 of the first ferromagnetic layer 1 and the surface-perpendicular direction in a state in which the light L is not applied from the light application part 20 to the magnetic element 11 (initial state) can be obtained from an angle between the direction of the magnetization M1 of the first ferromagnetic layer 1 and the direction of the magnetization M2 of the second ferromagnetic layer 2 in the initial state, and a relation between the direction of the magnetization M2 of the second ferromagnetic layer 2 and the surface-perpendicular direction in the initial state.

The angle between the direction of the magnetization M1 of the first ferromagnetic layer 1 and the direction of the magnetization M2 of the second ferromagnetic layer 2 in the initial state is obtained by the following Equation (1).

[Math 1]

$$\theta_0 = \cos^{-1}\left(\frac{2G_0 - (G_P + G_{AP})}{G_P - G_{AP}}\right) \quad (1)$$

In Equation (1), $G_0 = 1/R_0$, $G_P = 1/R_{min}$, and $G_{AP} = 1/R_{max}$ are satisfied. All $R_0$, $R_{min}$, and $R_{max}$ are resistance values of the magnetic element 11 in a state in which light L is not applied from the light application part 20 to the magnetic element 11. $R_0$ is a resistance value of the magnetic element 11 in a state in which an external magnetic field is not applied to the optical device 100. $R_{min}$ is a saturated resistance value of the magnetic element 11 when the applying intensity of the external magnetic field with respect to the optical device 100 is increased, and the external magnetic field at this time is applied in a direction of the magnetization M2 of the second ferromagnetic layer 2. $R_{max}$ is a saturated resistance value of the magnetic element 11 when the applying intensity of the external magnetic field with respect to the optical device 100 is increased, and the external magnetic field at this time is applied to a direction opposite to the direction of the magnetization M2 of the second ferromagnetic layer 2.

In the initial state, when the second ferromagnetic layer 2 is a vertical magnetization film, the direction of the magnetization M2 of the second ferromagnetic layer 2 and the surface-perpendicular direction have a parallel relation, and when the second ferromagnetic layer 2 is an in-plane magnetization film, the direction of the magnetization M2 of the second ferromagnetic layer 2 and the surface-perpendicular direction have a vertical relation.

As described above, in the optical device 100 according to the first embodiment, the output from the magnetic element 11 is continuously changed according to the intensity change of the light L over a wide intensity range of the light L applied to the magnetic element 11. Accordingly, the optical device 100 can detect the intensity of the light L over the wide intensity range of the light L.

While the optical device 100 according to the first embodiment has been described with specific examples so far, the optical device according to the first embodiment is not limited to this example.

Figure 7:
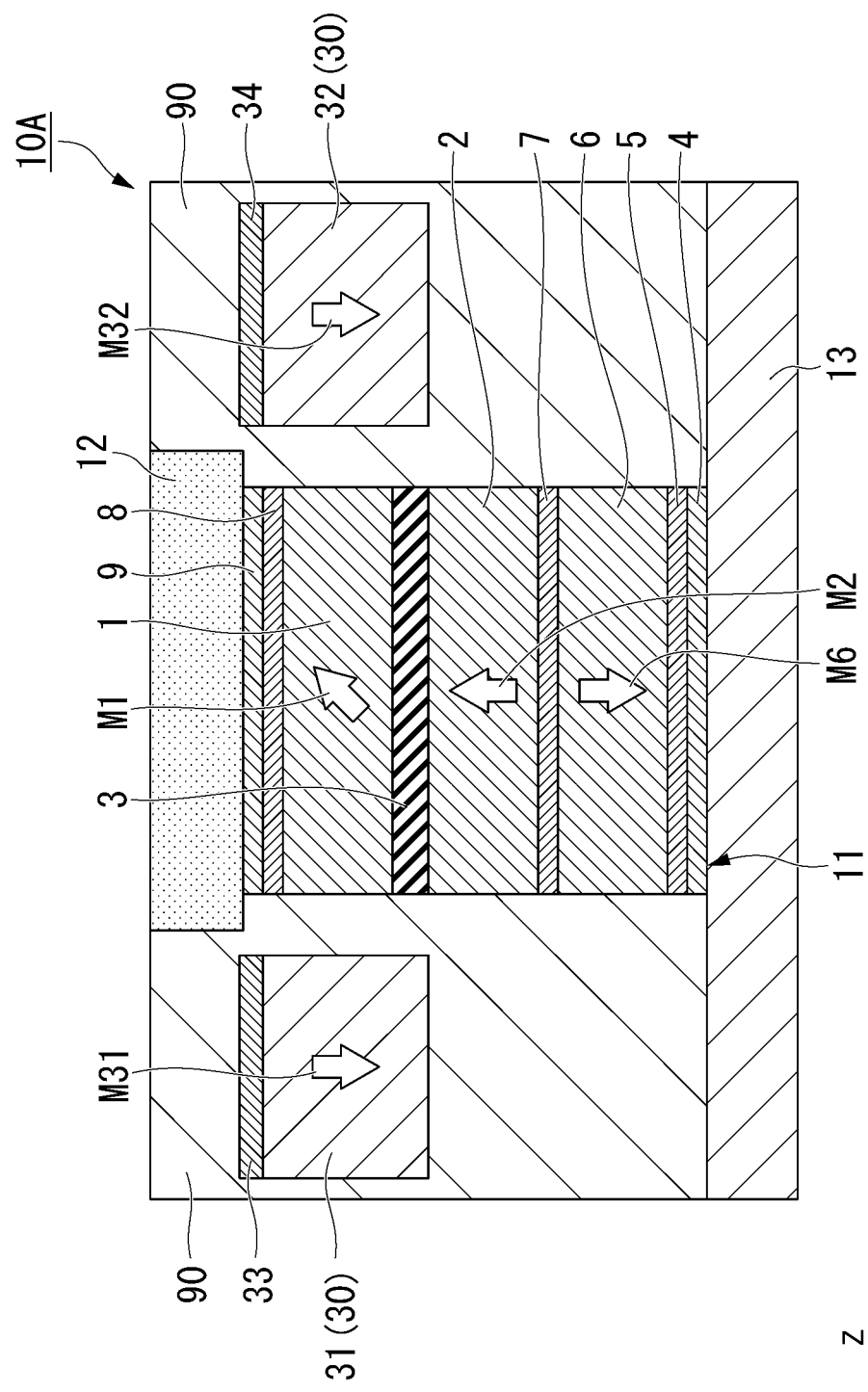
FIG. 7 is a cross-sectional view of a light detection element according to a first variant.

FIG. 7 is a cross-sectional view of a light detection element 10A according to a first variant. In the light detection element 10A, the first ferromagnetic layer 1 is an in-plane magnetization film, and the first ferromagnetic layer 31 and the second ferromagnetic layer 32 are vertical magnetization films. The magnetization M31 of the first ferromagnetic layer 31 and the magnetization M32 of the second ferromagnetic layer 32 are oriented, for example, in the z direction. Another configuration of the light detection element 10A according to the first variant is the same as the light detection element 10.

The magnetostatic leakage field from the first ferromagnetic layer 31 and the magnetostatic leakage field from the second ferromagnetic layer 32 are applied to the first ferromagnetic layer 1 as a bias magnetic field. When the first ferromagnetic layer 1 is the in-plane magnetization film, since the magnetic field with a component in the surface-perpendicular direction is applied from the magnetic field application part 30, the magnetization M1 is inclined with respect to the in-plane direction and the surface-perpendicular direction.

In the light detection element 10A, an angle between the direction of the magnetization M1 of the first ferromagnetic layer 1 and the surface-perpendicular direction in a state in which the light L is not applied from the light application part 20 to the magnetic element 11 may be, for example, 5° or more, 20° or more, or 35° or more. In addition, in the light detection element 10A in which the first ferromagnetic layer 1 is the in-plane magnetization film, an angle between the direction of the magnetization M1 of the first ferromagnetic layer 1 and the surface-perpendicular direction in the initial state may be 0° (the direction of the magnetization M1 of the first ferromagnetic layer 1 is parallel to the surface-perpendicular direction). That is, in the light detection element 10A in which the first ferromagnetic layer 1 is the in-plane magnetization film, the magnetization M1 of the first ferromagnetic layer 1 may be inclined with respect to the in-plane direction in which the first ferromagnetic layer 1 expands in a state in which light is not applied from the light application part 20 to the magnetic element 11. Even in this case, the RH curve of the magnetic element 11 shows no hysteresis, and the output voltage or the output current from the magnetic element 11 (a resistance value of the magnetic element 11) is continuously changed according to the intensity change of the light L over the wide intensity range of the light L. In addition, in the light detection element 10A, an angle between the direction of the magnetization M1 of the first ferromagnetic layer 1 and the surface-perpendicular direction in the initial state may be, for example, 85° or less, 70° or less, or 55° or less. As a result, since the movable range of the magnetization M1 with respect to the intensity change of the light L can be more reliably secured, the detection range of the intensity of the light L can be more reliably secured.

Here, while the example in which the first ferromagnetic layer 31 and the second ferromagnetic layer 32 are disposed to sandwich the first ferromagnetic layer 1 has been shown, one ferromagnetic layer may be disposed to surround the first ferromagnetic layer 1.

Second Embodiment

Figure 8:
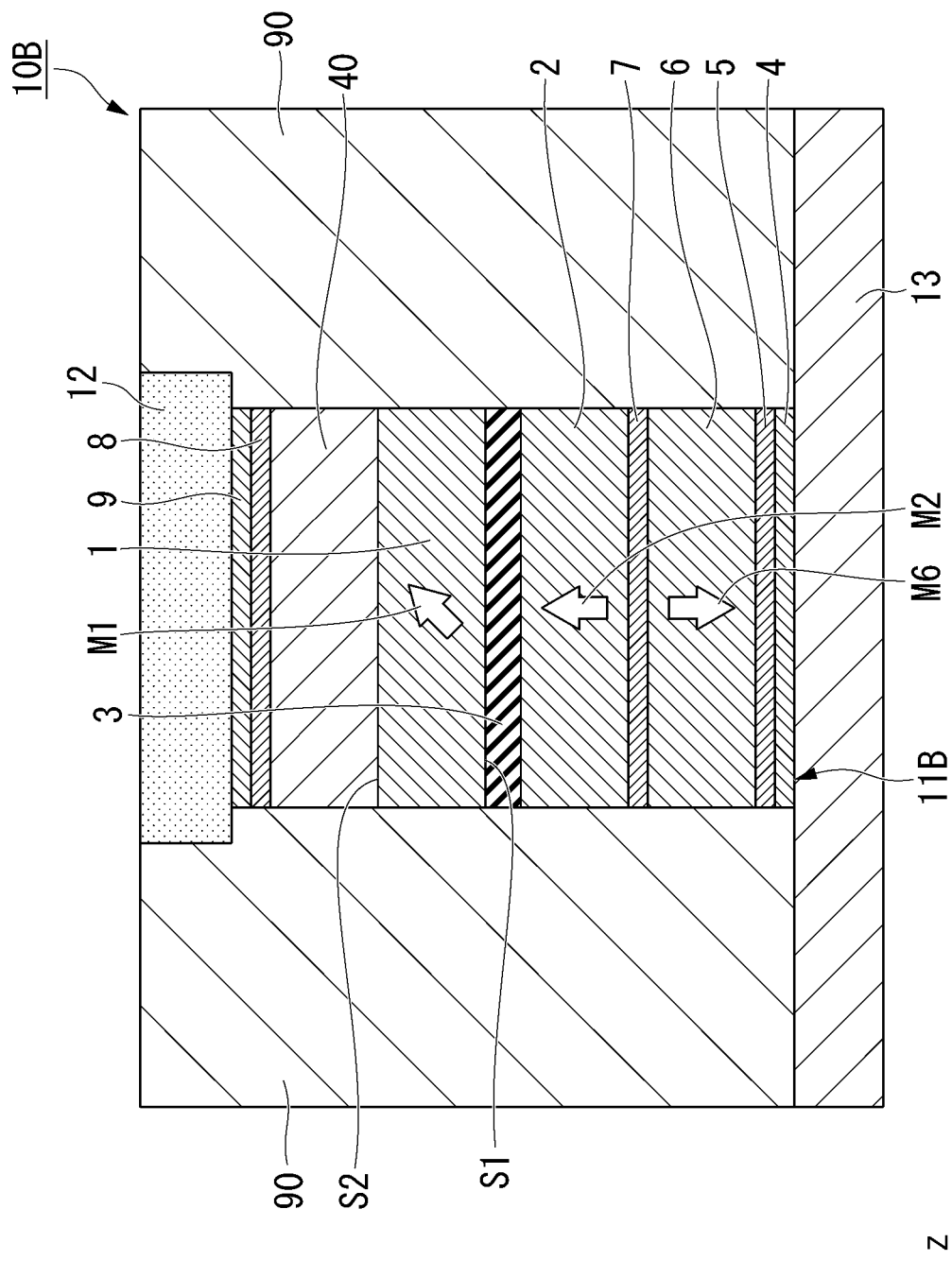
FIG. 8 is a cross-sectional view of a light detection element according to a second embodiment.

An optical device according to a second embodiment includes a light detection element 10B and a light application part 20. A configuration of the light application part 20 is the same as the optical device according to the first embodiment. FIG. 8 is a cross-sectional view of the light detection element 10B according to second embodiment. The light detection element 10B is distinguished from the light detection element 10 in that it does not include the magnetic field application part 30, and the magnetic element 11B includes an anti-ferromagnetic layer 40. In the light detection element 10B, the same components as the light detection element 10 are designated by the same reference signs, and description thereof will be omitted.

The magnetic element 11B includes an anti-ferromagnetic layer 40. The anti-ferromagnetic layer 40 is in contact with a second surface S2 of the first ferromagnetic layer 1. The second surface S2 is the surface opposite to a first surface S1 of the first ferromagnetic layer 1. The first surface S1 is the surface contacting the spacer layer 3.

When the first ferromagnetic layer 1 is the vertical magnetization film, a microscopic magnetic moment in the anti-ferromagnetic layer 40 is oriented in the in-plane direction. When the first ferromagnetic layer 1 is the vertical magnetization film, the anti-ferromagnetic layer 40 exhibits the same effect as the application of the magnetic field to the first ferromagnetic layer 1 in the in-plane direction due to an exchange bias, and the magnetization M1 is also inclined with respect to both the in-plane direction and the surface-perpendicular direction. When the first ferromagnetic layer 1 is the in-plane magnetization film, a microscopic magnetic moment in the anti-ferromagnetic layer 40 is oriented in the surface-perpendicular direction. When the first ferromagnetic layer 1 is the in-plane magnetization film, the anti-ferromagnetic layer 40 exhibits the same effect as the application of the magnetic field to the first ferromagnetic layer 1 in the surface-perpendicular direction due to the exchange bias, and the magnetization M1 is also inclined in both the in-plane direction and the surface-perpendicular direction. An orientation direction of the microscopic magnetic moment in the anti-ferromagnetic layer 40 can be freely designed according to the direction of the magnetic field when the magnetic field is cooled while being applied after the anti-ferromagnetic layer 40 is heated to a Curie temperature or more.

A known anti-ferromagnetic material can be used in the anti-ferromagnetic layer 40. The anti-ferromagnetic layer 40 may contain oxide showing anti-ferromagnetism. When the anti-ferromagnetic layer 40 is an oxide having permeability with respect to the light of the use wavelength region, the light L sufficiently reaches the first ferromagnetic layer 1. The anti-ferromagnetic layer 40 is, for example, nickel oxide (NiO), chromium oxide ($Cr_2O_3$), or cobalt oxide (CoO).

In the light detection element 10B according to the second embodiment, in a state in which the light L is not applied from the light application part 20 to the magnetic element 11B, since the magnetization M1 of the first ferromagnetic layer 1 is inclined with respect to the in-plane direction and the surface-perpendicular direction, the RH curve of the magnetic element 11B shows no hysteresis. Accordingly, like the optical device 100 according to the first embodiment, in the optical device according to the second embodiment, the output from the magnetic element 11B is continuously changed according to the intensity change of the light L over the wide intensity range of the light L applied to the magnetic element 11B.

Third Embodiment

Figure 9:
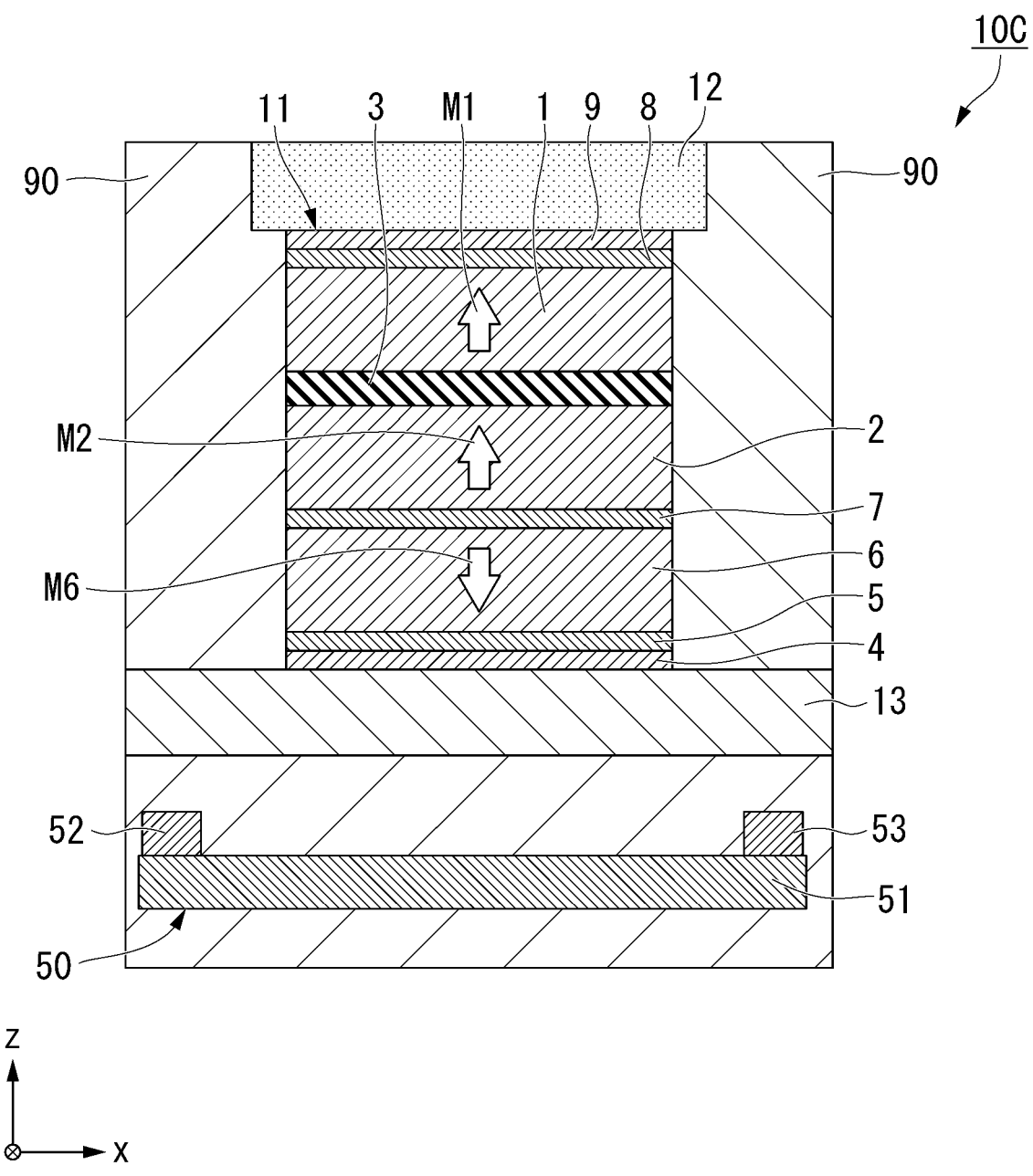
FIG. 9 is a cross-sectional view of a light detection element according to a third embodiment.

An optical device according to a third embodiment includes a light detection element 10C and a light application part 20. A configuration of the light application part 20 is the same as the optical device according to the first embodiment. FIG. 9 is a cross-sectional view of the light detection element 10C according to the third embodiment. The light detection element 10C is distinguished from the light detection element 10 in that it does not include the magnetic field application part 30 and includes a piezoelectric element 50. In the light detection element 10C, the same components as the light detection element 10 are designated by the same reference signs and description thereof will be omitted.

The light detection element 10C includes the piezoelectric element 50. The piezoelectric element 50 is located at a position where stress can be applied to the first ferromagnetic layer 1. For example, the piezoelectric element 50 is located at a position where the light L applied from the light application part 20 to the magnetic element 11 is not shielded. For example, the piezoelectric element 50 is opposite to a side where light is applied with reference to the magnetic element 11. For example, the insulating layer 90 is provided between the piezoelectric element 50 and the magnetic element 11.

The piezoelectric element 50 has, for example, a piezoelectric material 51, and electrodes 52 and 53. FIG. 9 is a cross-sectional view of a state in which a voltage is not applied to the piezoelectric material 51. The piezoelectric material 51 is deformed when a voltage is applied to the piezoelectric material 51 via the electrode 52 and the electrode 53. The piezoelectric element 50 applies stress to the first ferromagnetic layer 1 as the piezoelectric material 51 is deformed.

Figure 10A:
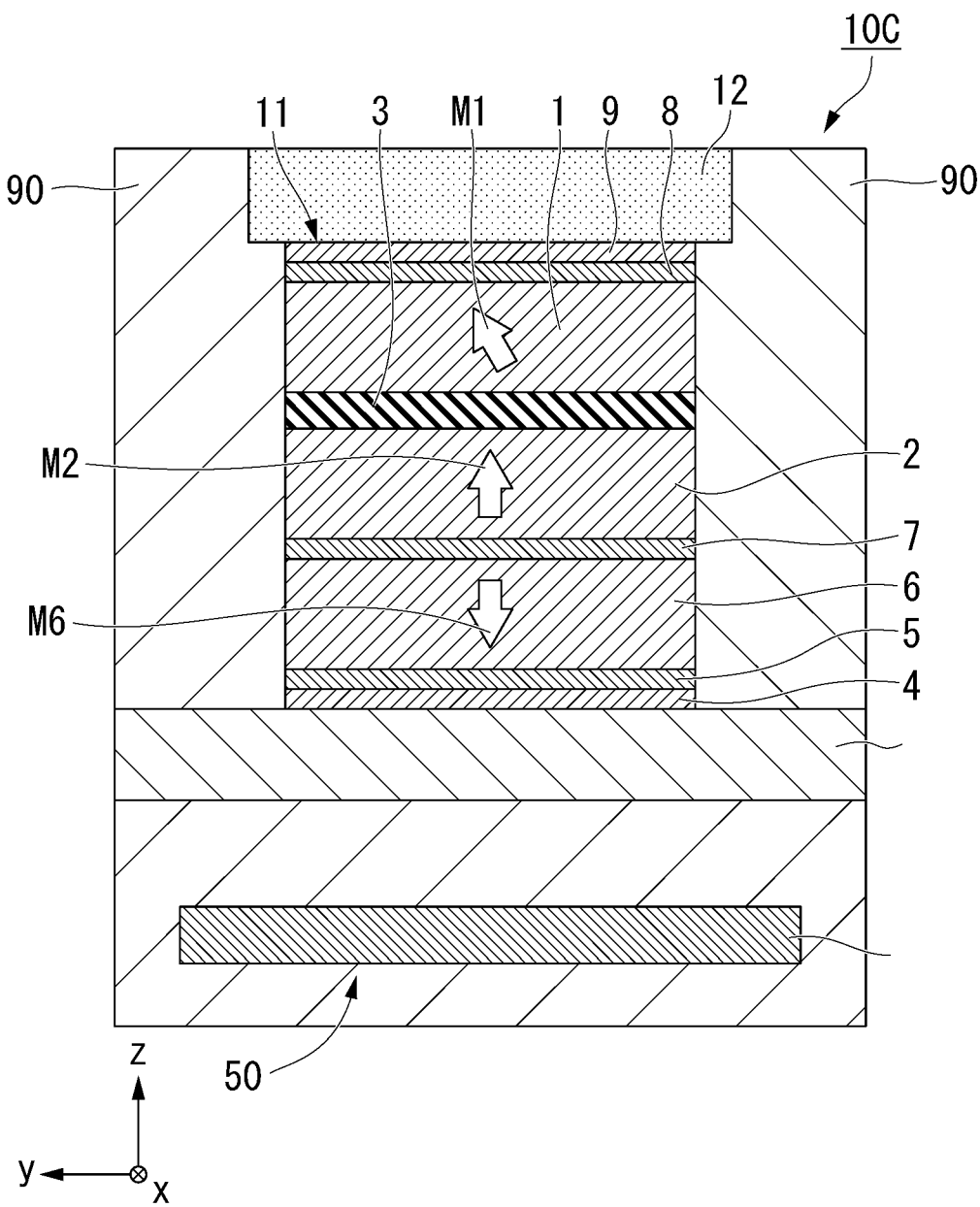
FIG. 10A is a cross-sectional view of a first state of the light detection element according to the third embodiment.
Figure 10B:
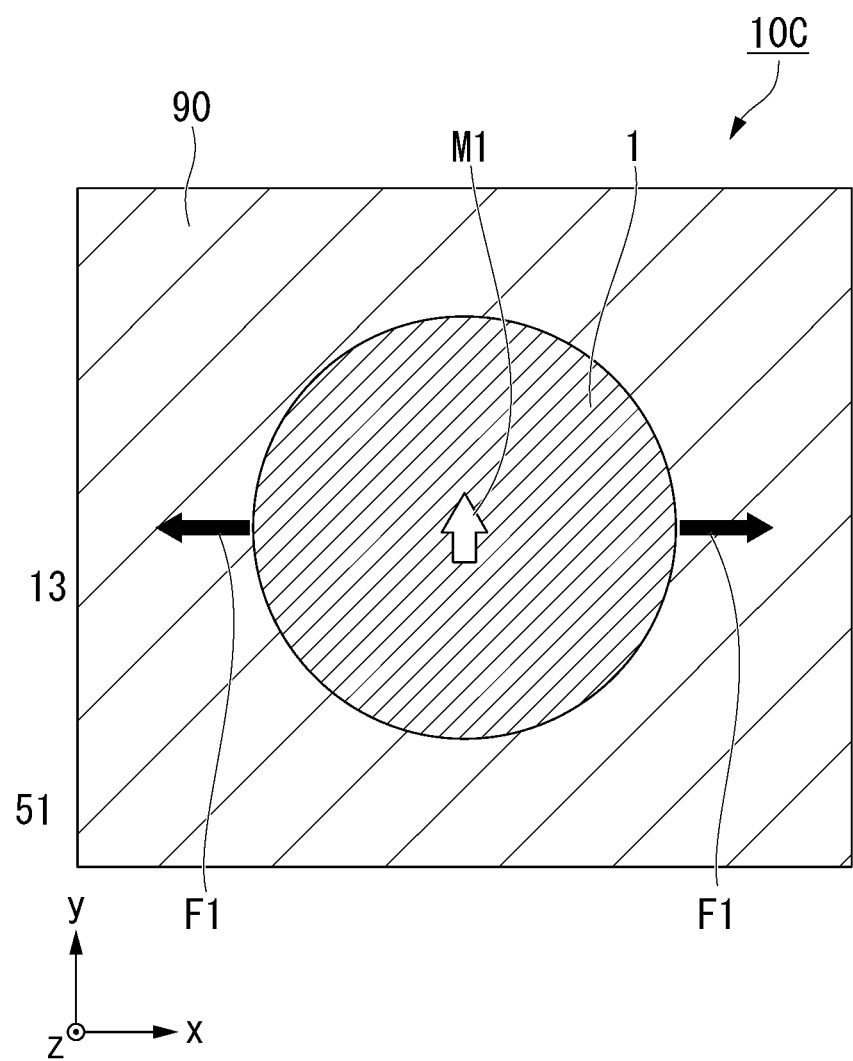
FIG. 10B is a cross-sectional view of a first state of the light detection element according to the third embodiment.

FIGS. 10A and 10B is a view showing a first state of the light detection element 10C according to the third embodiment. A left view of FIGS. 10A and 10B is an yz cross-sectional view. A right view of FIGS. 10A and 10B is a xy cross-sectional view passing through the first ferromagnetic layer 1. When a voltage is applied to the piezoelectric material 51, the piezoelectric material 51 is deformed. In the first state shown in FIGS. 10A and 10B, the piezoelectric material 51 is deformed such that a center of the piezoelectric material 51 in the x direction approaches the magnetic element 11 from a state before the voltage is applied.

In the first state, tensile stress F1 in the x direction is applied to the first ferromagnetic layer 1. When the tensile stress F1 is applied in the x direction of the first ferromagnetic layer 1, an anisotropic magnetic field is generated by a magneto-strictive effect, and the magnetization M1 of the first ferromagnetic layer 1 is inclined from the z direction toward the y direction. As a result, the magnetization M1 of the first ferromagnetic layer 1 is also inclined with respect to both the in-plane direction and the surface-perpendicular direction. Here, while the example in which the tensile stress F1 is applied in the x direction has been shown as an example, the direction in which the tensile stress F1 is applied may be any direction of the in-plane direction. The magnetization M1 of the first ferromagnetic layer 1 is inclined toward the in-plane direction perpendicular to the direction in which the tensile stress F1 is applied.

Figure 11A:
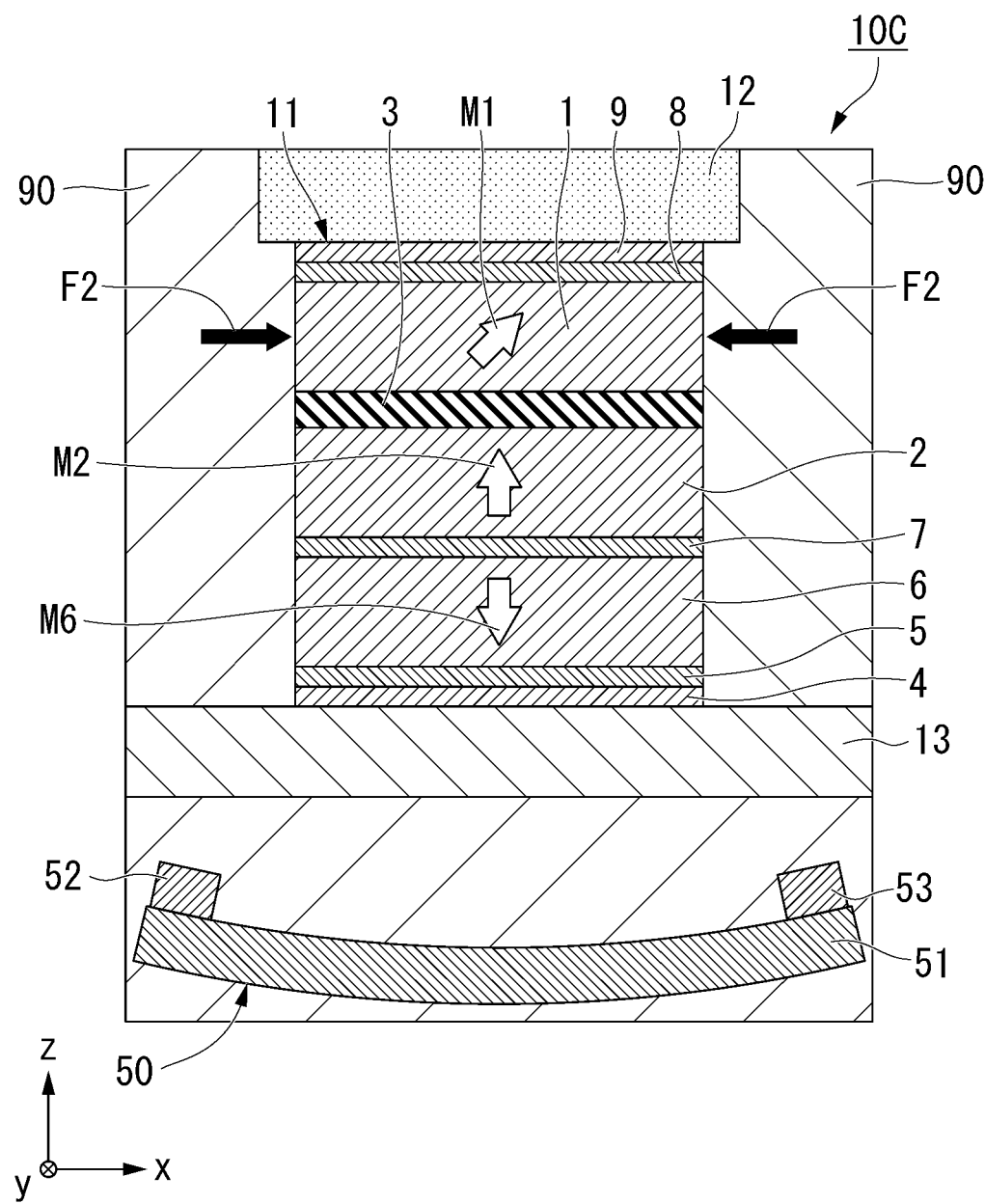
FIG. 11A is a cross-sectional view of a second state of the light detection element according to the third embodiment.
Figure 11B:
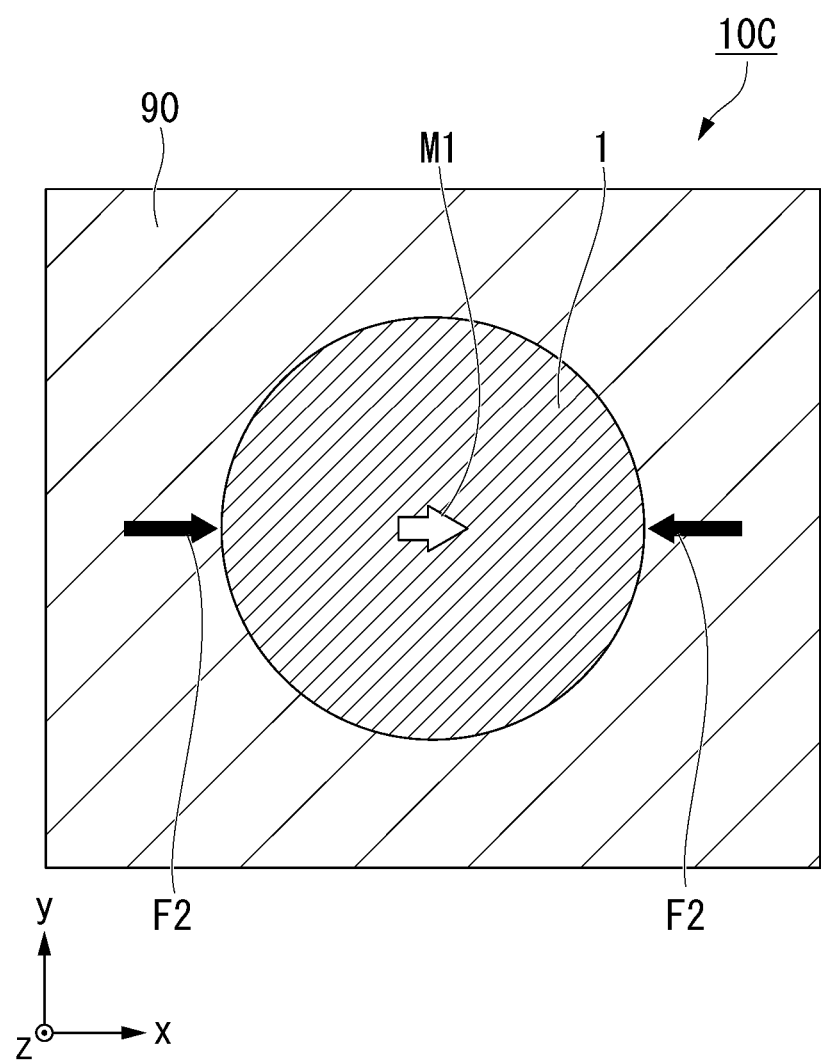
FIG. 11B is a cross-sectional view of a second state of the light detection element according to the third embodiment.

FIGS. 11A and 11B is a view showing a second state of the light detection element 10C according to the third embodiment. A left view of FIGS. 11A and 11B is an xz cross-sectional view. A right view of FIGS. 11A and 11B is a xy cross-sectional view through the first ferromagnetic layer 1. As shown in FIGS. 11A and 11B, when a voltage is applied to the piezoelectric material 51, the piezoelectric material 51 is deformed. In the second state shown in FIGS. 11A and 11B, the piezoelectric material 51 is deformed such that the center of the piezoelectric material 51 in the x direction is separated from the magnetic element 11 from a state before the voltage is applied.

In the second state, compressive stress F2 in the x direction is applied to the first ferromagnetic layer 1. When the compressive stress F2 is applied in the x direction of the first ferromagnetic layer 1, the anisotropic magnetic field is generated by the magneto-strictive effect, the magnetization M1 of the first ferromagnetic layer 1 is inclined from the z direction toward the x direction. As a result, the magnetization M1 of the first ferromagnetic layer 1 is inclined in both the in-plane direction and the surface-perpendicular direction. Here, while the example in which the compressive stress F2 is applied in the x direction has been shown as an example, the direction in which the compressive stress F2 is applied may be any direction of the in-plane direction. The magnetization M1 of the first ferromagnetic layer 1 is inclined in a direction parallel to the direction in which the compressive stress F2 is applied.

In the light detection element 10C according to the third embodiment, in a state in which the light L is not applied from the light application part 20 to the magnetic element 11, since the magnetization M1 of the first ferromagnetic layer 1 is inclined with respect to the in-plane direction and the surface-perpendicular direction, the RH curve of the magnetic element 11 shows no hysteresis. Accordingly, like the optical device 100 according to the first embodiment, in the optical device according to the third embodiment, the output from the magnetic element 11 is continuously changed according to the intensity change of the light L over the wide intensity range of the light L applied to the magnetic element 11.

Fourth Embodiment

Figure 12:
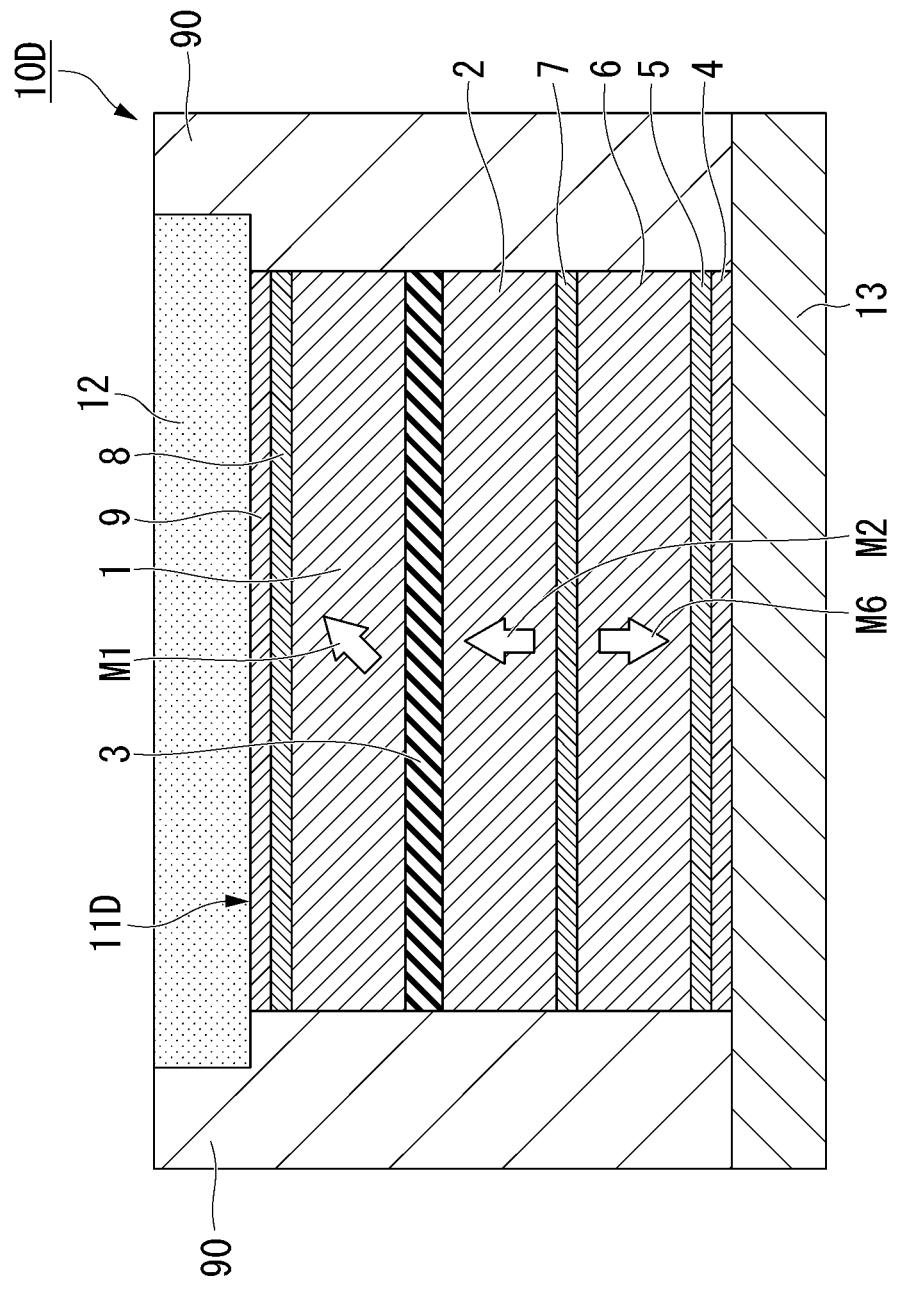
FIG. 12 is a cross-sectional view of a light detection element according to a fourth embodiment.
Figure 13:
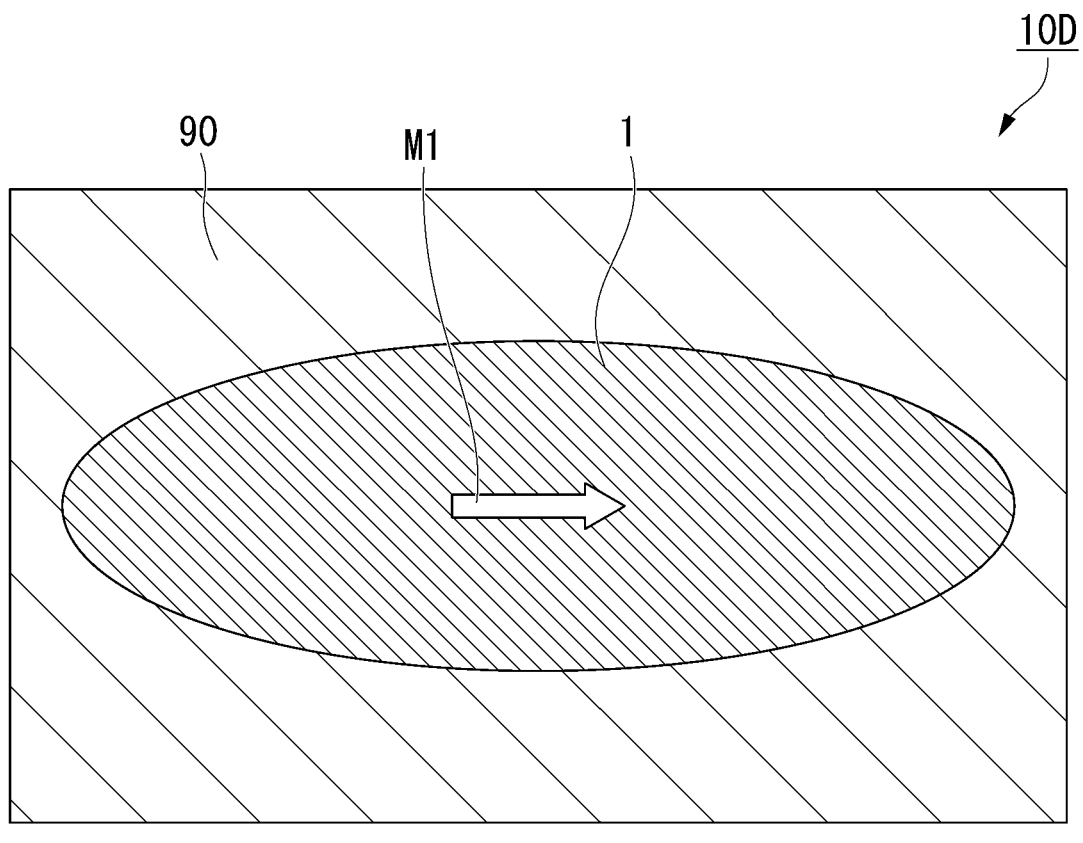
FIG. 13 is another cross-sectional view of the light detection element according to the fourth embodiment.

An optical device according to a fourth embodiment includes a light detection element 10D and a light application part 20. A configuration of the light application part 20 is the same as the optical device according to the first embodiment. FIG. 12 is a cross-sectional view of the light detection element 10D according to the fourth embodiment. FIG. 13 is a cross-sectional view of the light detection element 10D according to the fourth embodiment. FIG. 12 is a xz cross section of the light detection element 10D, and FIG. 13 is a xy cross section through the first ferromagnetic layer 1 of the light detection element 10D. The light detection element 10D is distinguished from the light detection element 10 in that it does not include the magnetic field application part 30 and a shape of a magnetic element 11D when seen in a plan view is different from the magnetic element 11. In the light detection element 10D, the same components as the light detection element 10 are designated by the same reference signs and description thereof will be omitted.

The first ferromagnetic layer 1 of the magnetic element 11D has an elliptical shape when seen in a plan view in the z direction. In the first ferromagnetic layer 1, when seen in the z direction, an aspect ratio obtained by dividing a length in the longitudinal direction by a length in the lateral direction is greater than 1. The anisotropic magnetic field due to form anisotropy of the first ferromagnetic layer 1 is generated in the first ferromagnetic layer 1. The magnetization M1 of the first ferromagnetic layer 1 is inclined from the z direction toward a direction in which the anisotropic magnetic field is applied. Here, while the case in which a shape of the first ferromagnetic layer 1 when seen in a plan view is an ellipse has been shown, it is not limited to this example as long as the lengths in the longitudinal direction and the lateral direction are different.

In the light detection element 10D according to the fourth embodiment, in a state in which the light L is not applied from the light application part 20 to the magnetic element 11D, since the magnetization M1 of the first ferromagnetic layer 1 is inclined with respect to the in-plane direction and the surface-perpendicular direction, the RH curve of the magnetic element 11D shows no hysteresis. Accordingly, like the optical device 100 according to the first embodiment, in the optical device according to the fourth embodiment, the output from the magnetic element 11D is continuously changed according to the intensity change of the light L over the wide intensity range of the light L applied to the magnetic element 11D.

Fifth Embodiment

Figure 14:
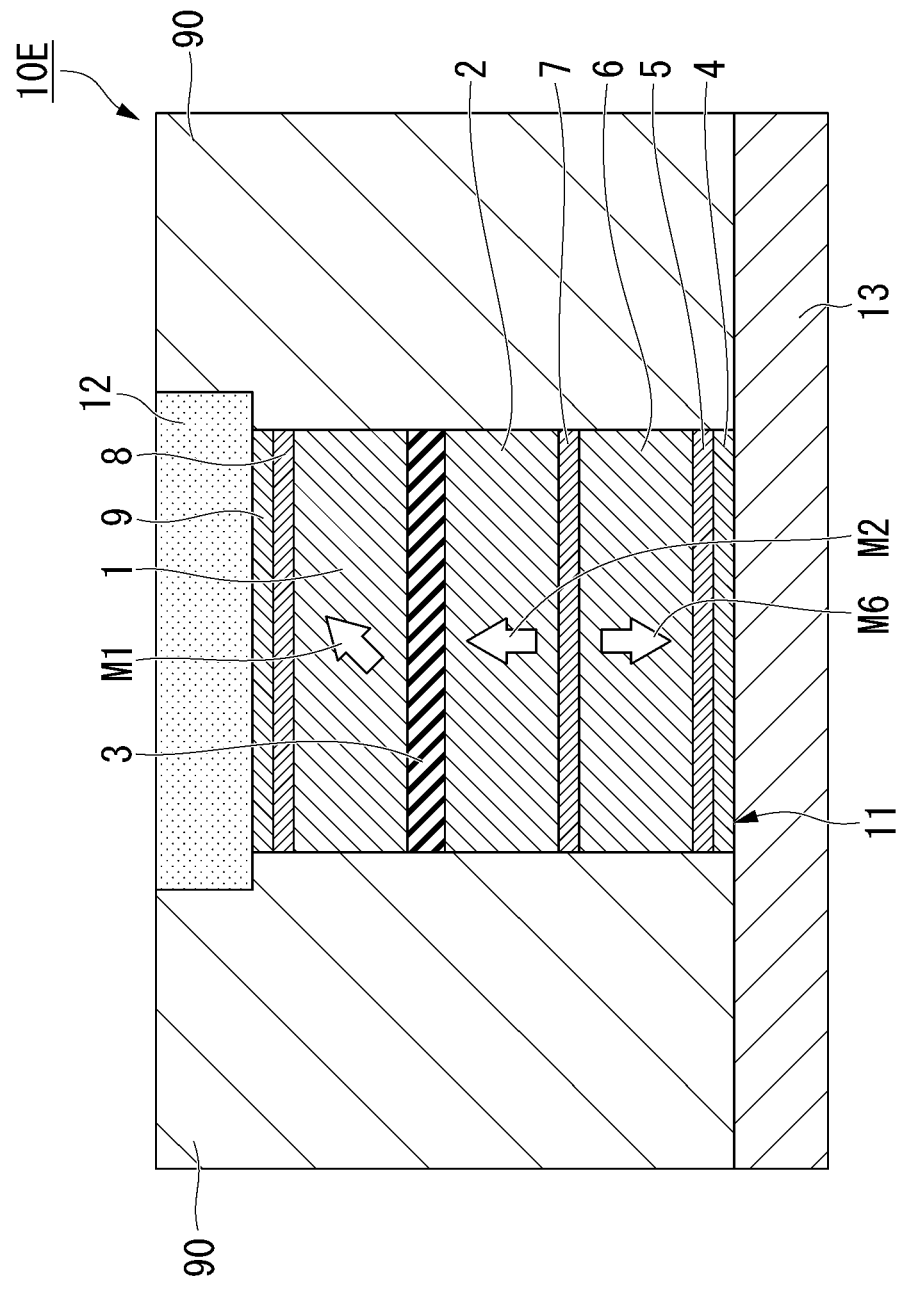
FIG. 14 is a cross-sectional view of a light detection element according to a fifth embodiment.

An optical device according to a fifth embodiment includes a light detection element 10E and a light application part 20. A configuration of the light application part 20 is the same as the optical device according to the first embodiment. FIG. 14 is a cross-sectional view of the light detection element 10E according to the fifth embodiment. The light detection element 10E is distinguished from the light detection element 10 in that it does not include the magnetic field application part 30. In the light detection element 10E, the same components as the light detection element 10 are designated by the same reference signs and description thereof will be omitted.

The magnetization M1 of the first ferromagnetic layer 1 is inclined with respect to the in-plane direction and the surface-perpendicular direction in a state in which the light L from the light application part 20 is not applied to the magnetic element 11. The orientation direction of the magnetization M1 of the first ferromagnetic layer 1 can be controlled with a thickness of the first ferromagnetic layer 1 in a state in which the light L from the light application part 20 is not applied to the magnetic element 11. When the thickness of the first ferromagnetic layer 1 is small, the vertical magnetic anisotropic applying effect is strongly generated in the first ferromagnetic layer 1 from the interface between the upper and lower layers, and the magnetization M1 of the first ferromagnetic layer 1 is oriented in the z direction. On the other hand, when the thickness of the first ferromagnetic layer 1 is great, the vertical magnetic anisotropic applying effect is weakened, and the magnetization M1 is inclined in any direction of the in-plane direction from the z direction.

In the light detection element 10E according to the fifth embodiment, in a state in which the light L is not applied from the light application part 20 to the magnetic element 11, since the magnetization M1 of the first ferromagnetic layer 1 is inclined with respect to the in-plane direction and the surface-perpendicular direction, the RH curve of the magnetic element 11 shows no hysteresis. Accordingly, like the optical device 100 according to the first embodiment, in the optical device according to the fifth embodiment, the output from the magnetic element 11 is continuously changed according to the intensity change of the light L over the wide intensity range of the light L applied to the magnetic element 11.

Sixth Embodiment

Figure 15:
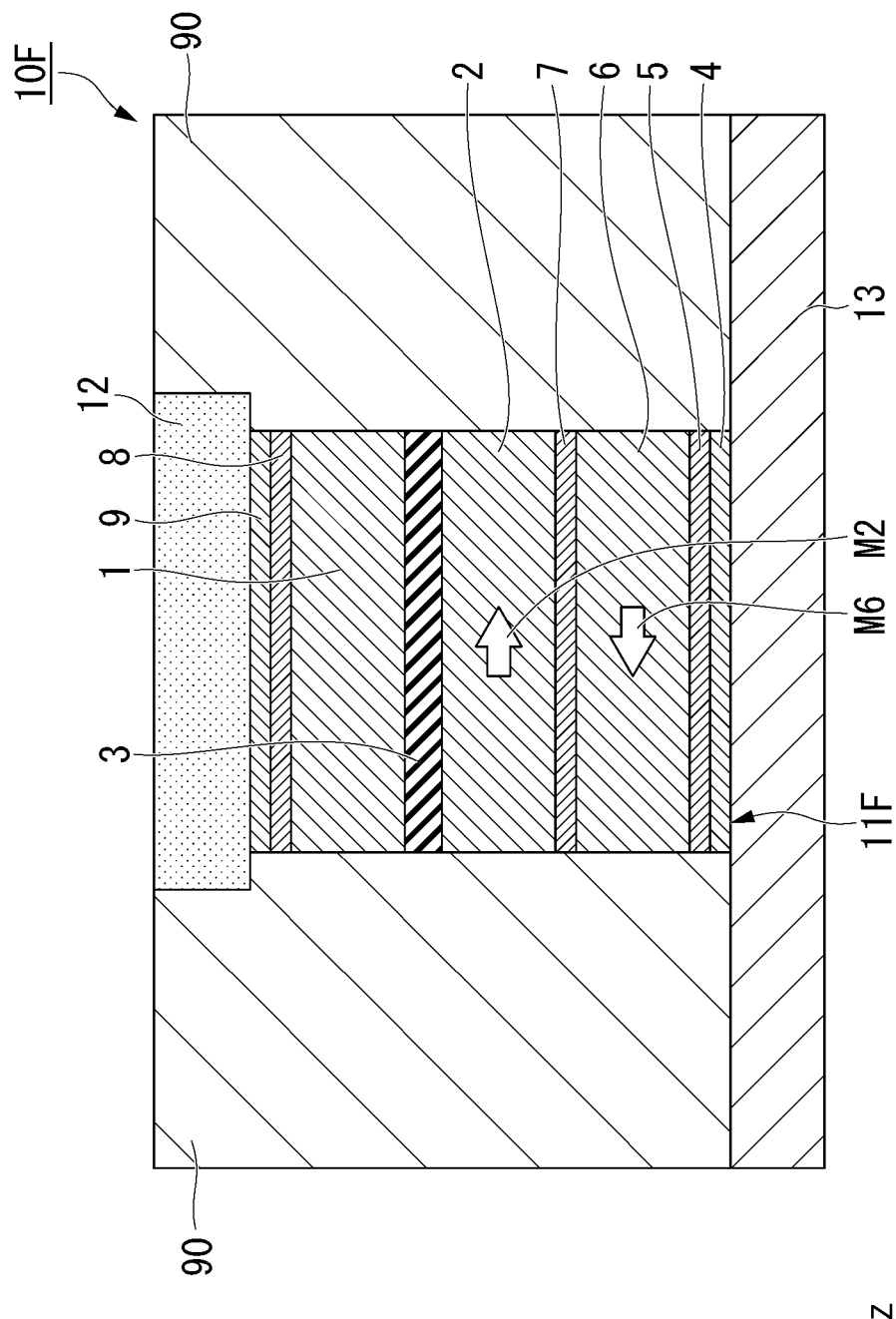
FIG. 15 is a cross-sectional view of the light detection element according to a sixth embodiment.
Figure 16:
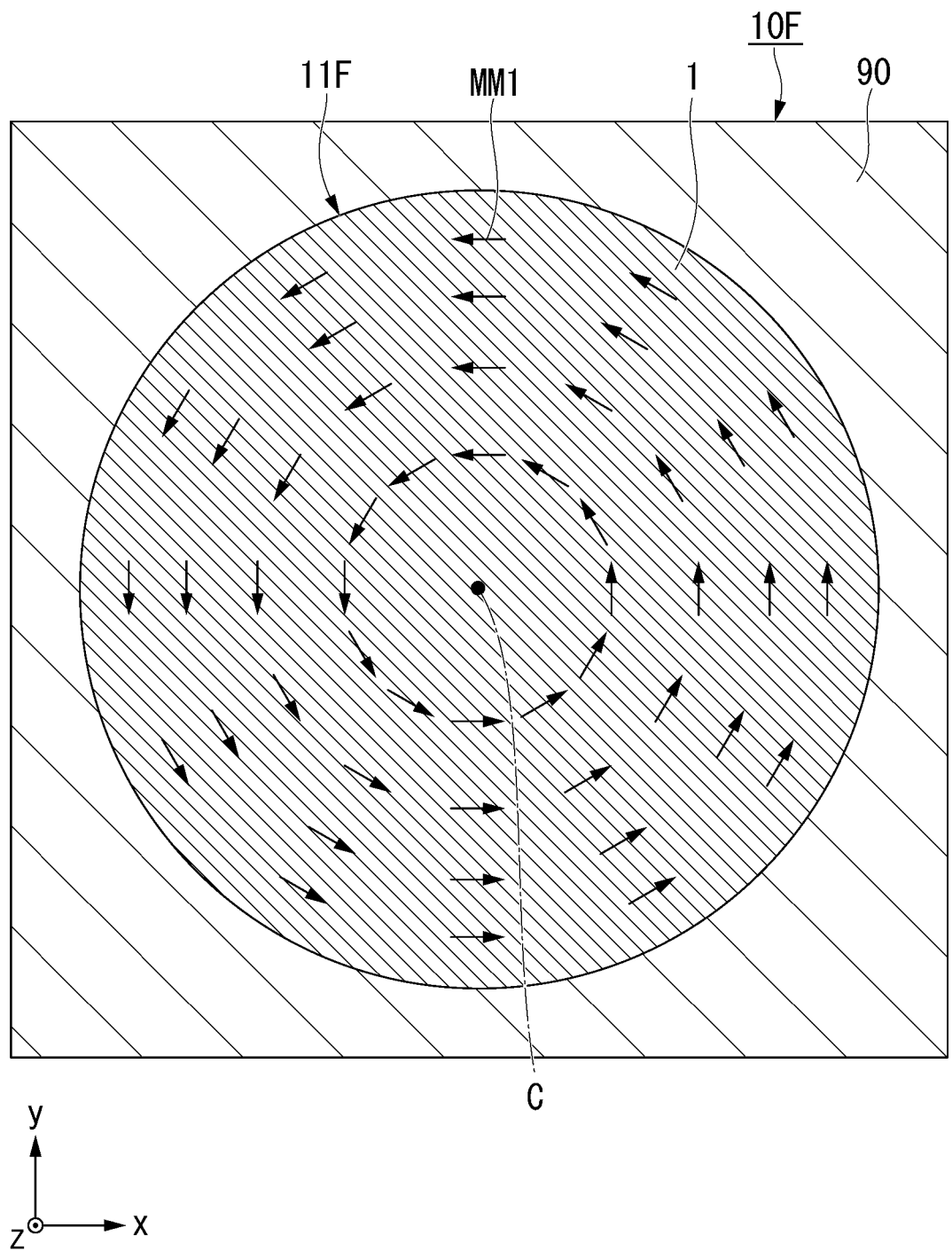
FIG. 16 is another cross-sectional view of the light detection element according to the sixth embodiment.

An optical device according to a sixth embodiment includes a light detection element 10F and a light application part 20. A configuration of the light application part 20 is the same as the optical device according to the first embodiment. FIG. 15 is a cross-sectional view of the light detection element 10F according to the sixth embodiment. FIG. 16 is a cross-sectional view of the light detection element 10F according to the sixth embodiment. FIG. 15 is an xz cross section of the light detection element 10F, and FIG. 16 is a xy cross section through the first ferromagnetic layer 1 of the light detection element 10F. The light detection element 10F is distinguished from the light detection element 10 in that it does not include the magnetic field application part 30 and the magnetic element 11F is provided instead of the magnetic element 11. In the light detection element 10F, the same components as the light detection element 10 are designated by the same reference signs and description thereof will be omitted.

The first ferromagnetic layer 1, the second ferromagnetic layer 2 and the ferromagnetic layer 6 of the magnetic element 11F are in-plane magnetization films. A magnetic domain structure of the first ferromagnetic layer 1 of the magnetic element 11F becomes a vortex structure in a state in which the light L is not applied from the light application part 20 to the magnetic element 11F. The vortex structure is a structure in which a magnetic moment MM1 swirls in the in-plane direction to surround a center C. The vortex structure is expressed by adjusting the thickness of the first ferromagnetic layer 1 and the diameter when seen in a plan view. For example, when the first ferromagnetic layer 1 is formed of FeB, if the thickness of the first ferromagnetic layer 1 is 10 nm and the diameter is 1.1 µm the magnetic domain structure of the first ferromagnetic layer 1 becomes a vortex structure. In addition, for example, when the first ferromagnetic layer 1 is formed of NiFe, if the thickness of the first ferromagnetic layer 1 is 15 nm and the diameter is 170 nm, the magnetic domain structure of the first ferromagnetic layer 1 becomes a vortex structure. In addition, for example, when the first ferromagnetic layer 1 is formed of CoFeB, if the thickness of the first ferromagnetic layer 1 is 10 nm and the diameter is 300 nm, the magnetic domain structure of the first ferromagnetic layer 1 becomes a vortex structure.

Figure 17:
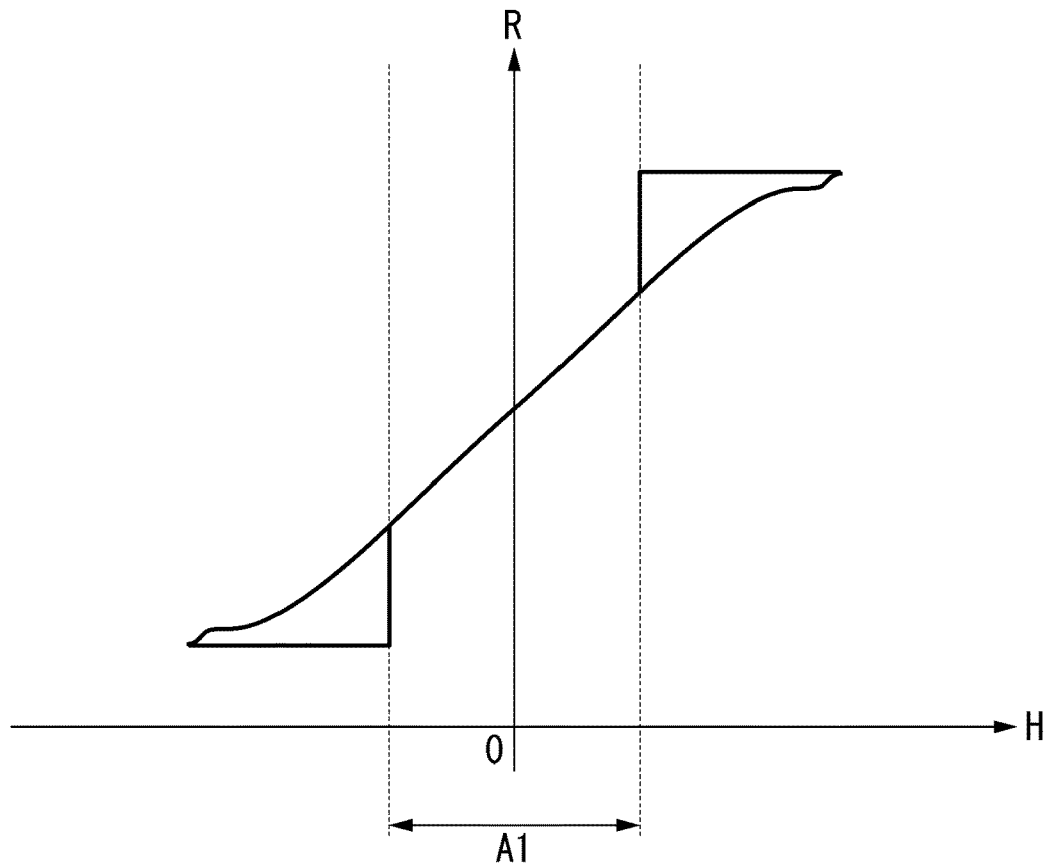
FIG. 17 is a view showing an RH curve of a magnetic element according to the sixth embodiment.

FIG. 17 is a view showing an RH curve of the magnetic element 11F according to the sixth embodiment. In the example, the external magnetic field is a magnetic field in the in-plane direction (in the example, in the x direction) that is the direction of the magnetization M2 of the second ferromagnetic layer 2. When the magnetic domain structure of the first ferromagnetic layer 1 is the vortex structure, in a state in which the light L is not applied from the light application part 20 to the magnetic element 11F, the RH curve of the magnetic element 11F shows no hysteresis in a range A1 of the external magnetic field strength including zero.

In the light detection element 10F according to the sixth embodiment, in a state in which the light L from the light application part 20 is not applied from the light application part 20 to the magnetic element 11F, the RH curve of the magnetic element 11F shows no hysteresis in the range A1 of the external magnetic field strength including zero. Accordingly, like the optical device 100 according to the first embodiment, in the optical device according to the sixth embodiment, the output from the magnetic element 11F is continuously changed according to the intensity change of the light L over the wide intensity range of the light L applied to the magnetic element 11F.

Hereinabove, the present disclosure is not limited to the above-mentioned embodiments and variants, and various modifications and changes may be made without departing from the scope of the spirit of the present disclosure described in the claims. For example, each of characteristic configurations of the embodiments and each of characteristic configurations of the variants may be combined.

In addition, from the first embodiment to the fifth embodiment, in a state in which the light L is not applied to the magnetic element, the magnetization M1 of the first ferromagnetic layer 1 is inclined in the in-plane direction and the surface-perpendicular direction, in the sixth embodiment, in a state in which the light L is not applied to the magnetic element, the magnetic domain structure of the first ferromagnetic layer 1 is the vortex structure, and thus, at least in the range of the external magnetic field strength including zero, the example in which a state in which the RH curve of the magnetic element shows no hysteresis has been shown. In a state in which the light L is not applied to the magnetic element, at least in the range of the external magnetic field strength including zero, a method of realizing a state in which the RH curve of the magnetic element shows no hysteresis is not limited thereto. In a state in which the light L is not applied to the magnetic element, at least in the range of the external magnetic field strength including zero, when the RH curve of the magnetic element shows no hysteresis, the output from the magnetic element is continuously changed according to the change in intensity of light over the wide intensity range of the light applied to the magnetic element.

The optical devices according to the embodiments and variants can be applied to a light sensor device such as an image sensor or the like, a transceiver device of a communication system, or the like.

Figure 18:
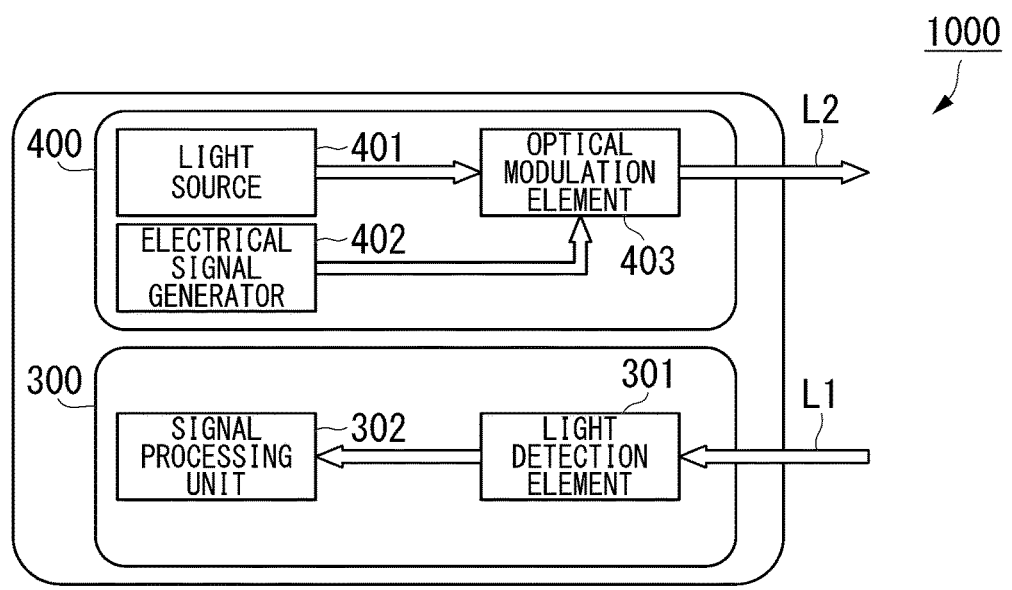
FIG. 18 is a block diagram of a transceiver device according to a first application example.

FIG. 18 is a block diagram of a transceiver device 1000 according to a first application example. The transceiver device 1000 includes a receiving device 300 and a transmitting device 400. The receiving device 300 receives an optical signal L1, and the transmitting device 400 transmits an optical signal L2.

The receiving device 300 includes, for example, a light detection element 301 and a signal processing unit 302. A device including the light detection element 301 and the light application part configured to apply the optical signal L1 may be one optical device of the above-mentioned embodiments or variants. In the receiving device 300, the light that changes the intensity and includes the optical signal L1 with a radio frequency passes through a lens (not shown) as a light application part and is applied to the first ferromagnetic layer 1 of the magnetic element. The light detection element 301 converts the optical signal L1 into an electric signal. The signal processing unit 302 processes the electric signal converted by the light detection element 301. The signal processing unit 302 receives the signal included in the optical signal L1 by processing the electric signal generated from the light detection element 301. The receiving device 300 receives the signal included in the optical signal L1 on the basis of, for example, the output voltage of the magnetic element.

The transmitting device 400 includes, for example, a light source 401, an electric signal generator 402, and an optical modulation element 403. The light source 401 is, for example, a laser element. The light source 401 may be disposed outside the transmitting device 400. The electric signal generator 402 generates an electric signal on the basis of the transmitted information. The electric signal generator 402 may be integrated with the signal conversion element of the signal processing unit 302. The optical modulation element 403 modulates the light output from the light source 401 and outputs the optical signal L2 on the basis of the electric signal generated by the electric signal generator 402.

Figure 19:
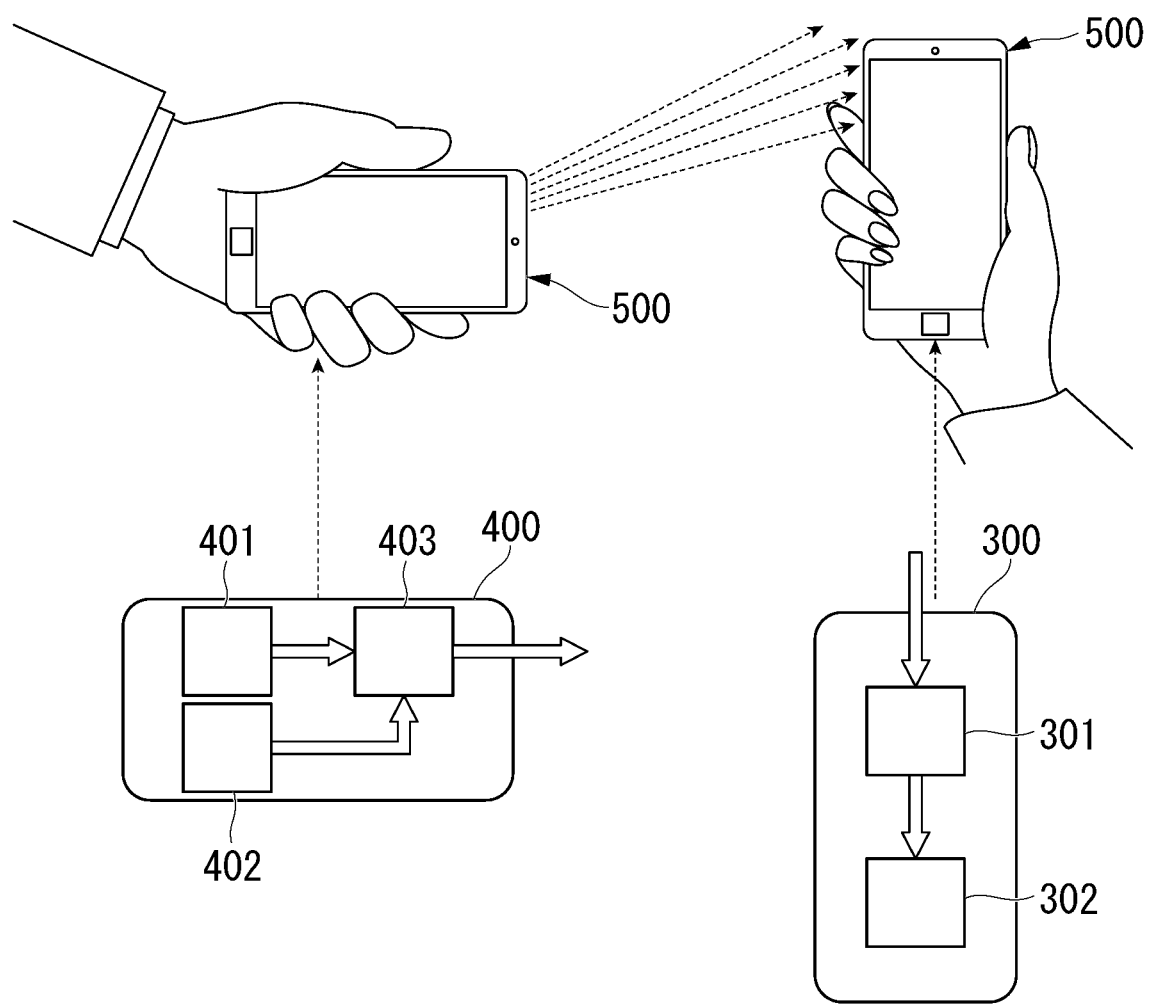
FIG. 19 is a conceptual view of an example of a communication system.

FIG. 19 is a conceptual view of an example of a communication system. The communication system shown in FIG. 19 has two terminal devices 500. The terminal device 500 is, for example, a smartphone, a tablet, a personal computer, or the like.

Each of the terminal devices 500 includes the receiving device 300 and the transmitting device 400. An optical signal transmitted from the transmitting device 400 of one of the terminal devices 500 is received by the receiving device 300 of the other terminal device 500. The light used for transmission and reception between the terminal devices 500 is, for example, visible light. The receiving device 300 has the above-mentioned light detection element as the light detection element 301.

Figure 20:
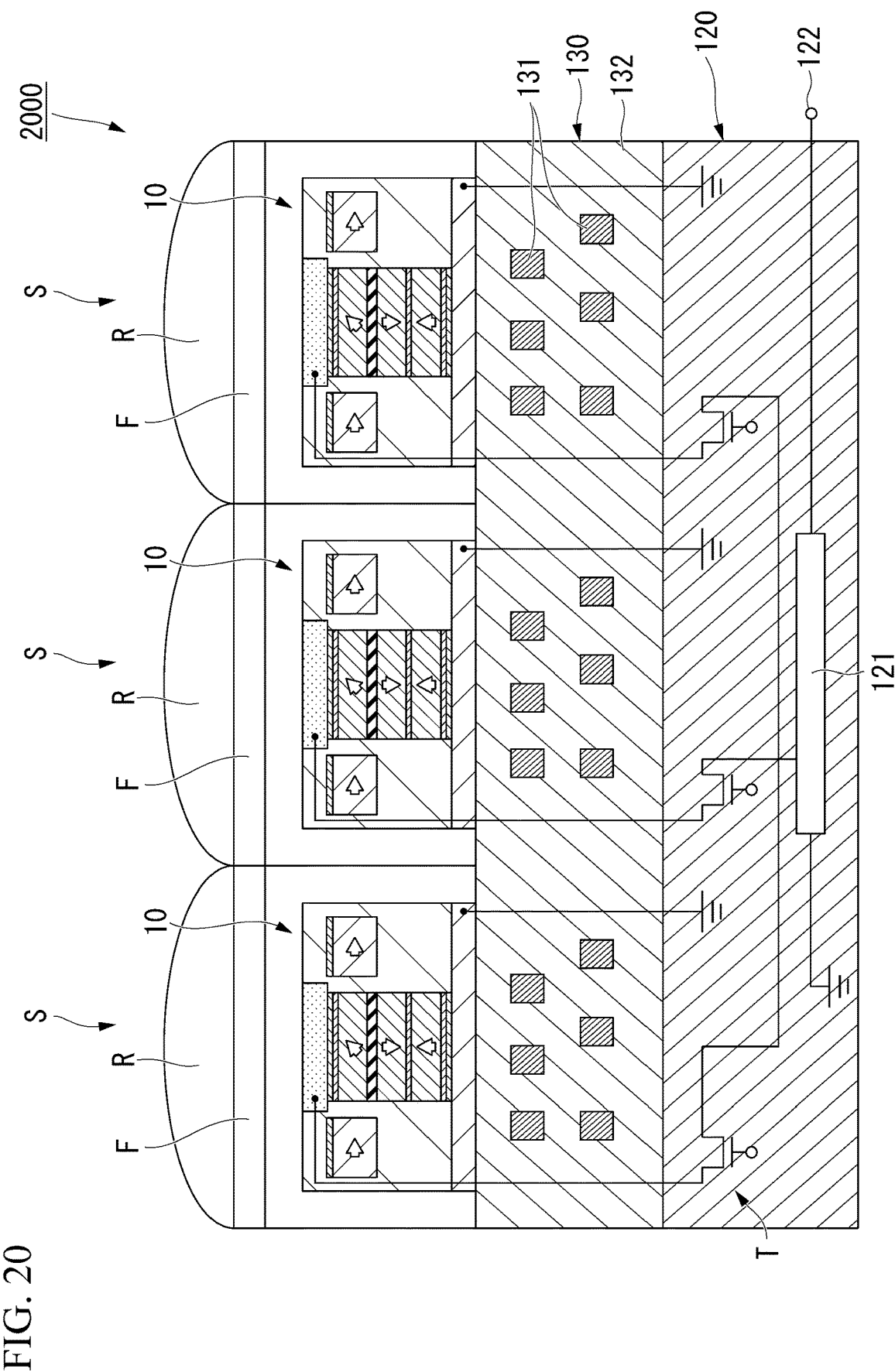
FIG. 20 is a conceptual view of a cross section of a light sensor device according to a second application example.

FIG. 20 is a conceptual view of a cross section of a light sensor device 2000 according to a second application example. The light sensor device 2000 has, for example, a circuit substrate 120, a wiring layer 130 and a plurality of light sensors S. Each of the wiring layer 130 and the light sensors S is formed on the circuit substrate 120.

Each of the light sensors S has, for example, the light detection element 10, a wavelength filter F and a lens R. While the example using the light detection element 10 has been shown in FIG. 20, a light detection element according to another embodiment and variant may be used. In the example, the wavelength filter F and the lens R constitute the light application part. Light passing through the lens R and the wavelength filter F is applied to the magnetic element of the light detection element 10.

The wavelength filters F select light of specific wavelengths and transmit the light within the specific wavelength region. The wavelength regions of the light passing through the wavelength filters F may be the same or may be different from each other. For example, the light sensor device 2000 may have the light sensor S (hereinafter, referred to as a blue sensor) having the wavelength filter F configured to transmit blue color (a wavelength region of 380 nm or more and less than 490 nm), the light sensor S (hereinafter, referred to as a green sensor) having the wavelength filter F configured to transmit green color (a wavelength region of 490 nm or more and less than 590 nm), and the light sensor S (hereinafter, referred to as a red sensor) having the wavelength filter F configured to transmit red color (a wavelength region of 590 nm or more and less than 800 nm). The light sensor device 2000 can be used as an image sensor by setting the blue sensor, the green sensor and the red sensor as one pixel and disposing the pixels. In the light sensor device 2000 shown in FIG. 20, since the output from the magnetic element 11 of the light detection element 10 is continuously changed according to the change in intensity of light over the wide intensity range of the light applied to the magnetic element 11, the intensity of light can be detected over the wide intensity range.

The lens R condenses light toward the magnetic element of the light detection element 10. Even when one magnetic element is disposed below the one wavelength filter F, a plurality of magnetic elements may be disposed.

The circuit substrate 120 has, for example, an analog-digital converter 121 and an output terminal 122. The electric signal sent from the light sensors S is substituted with digital data by the analog-digital converter 121, and output from the output terminal 122.

The wiring layer 130 has a plurality of wirings 131. An interlayer insulating film 132 is provided between the wirings 131. The wirings 131 electrically connect each of the light sensors S and the circuit substrate 120, and electrically connect arithmetic circuits formed on the circuit substrate 120. Each of the light sensors S and the circuit substrate 120 are connected via, for example, a through wiring passing through the interlayer insulating film 132 in the z direction. Noise can be reduced by shortening an inter-wiring distance between each of the light sensors S and the circuit substrate 120.

The wirings 131 have conductivity. The wirings 131 are formed of, for example, Al, Cu, or the like. The interlayer insulating film 132 is an insulating material that insulates between wirings of a multi-layered wiring or between elements. The interlayer insulating film 132 is formed of, for example, oxide, nitride, or oxynitride of Si, Al, or Mg. The interlayer insulating film 132 is formed of, for example, silicon oxide ($SiO_x$), silicon nitride ($SiN_x$), silicon carbide (SiC), chromium nitride, carbon silicon nitride (SiCN), silicon oxynitride (SiON), aluminum oxide ($Al_2O_3$), zirconium oxide ($ZrO_x$), or the like.

Figure 21A:
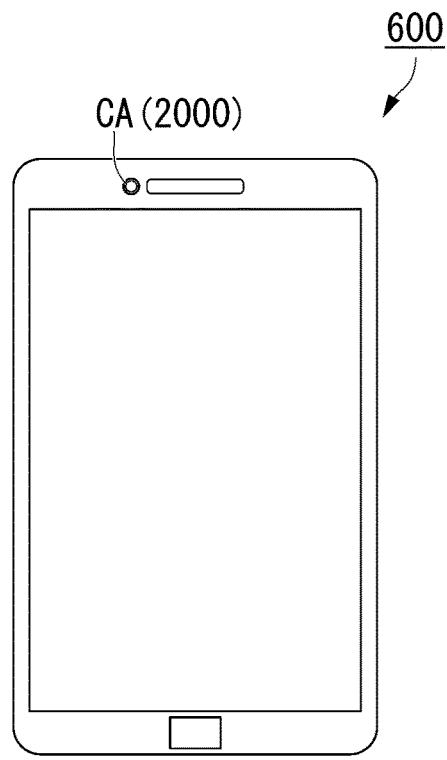
FIG. 21A is a schematic view of an example of a terminal device.
Figure 21B:
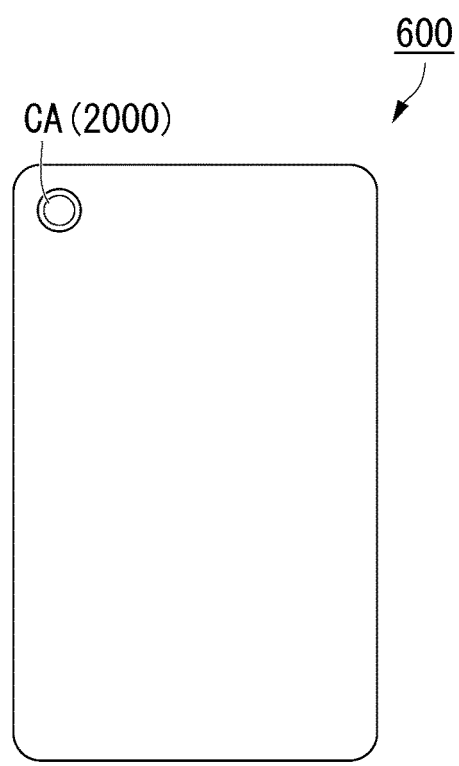
FIG. 21B is a schematic view of an example of a terminal device.

The above-mentioned light sensor device 2000 can use, for example, a terminal device. FIGS. 21A and 21B is a schematic view of an example of a terminal device 600. A left side of FIGS. 21A and 21B is a front surface of the terminal device 600, and a right side of FIGS. 21A and 21B is a back surface of the terminal device 600. The terminal device 600 has a camera CA. The above-mentioned light sensor device 2000 can use an image pickup element of the camera CA. In FIGS. 21A and 21B, while a smartphone has been exemplified as an example of the terminal device 600, it is not limited thereto. The terminal device 600 is, for example, a tablet, a personal computer, a digital camera, or the like, in addition to the smartphone.

While embodiments of the disclosure have been described and illustrated above, it should be understood that these are exemplary of the disclosure and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical device comprising a magnetic element and a light application part,
   wherein the light application part is configured to apply light to the magnetic element,
   the magnetic element includes a first ferromagnetic layer to which the light is applied, a second ferromagnetic layer, and a spacer layer sandwiched between the first ferromagnetic layer and the second ferromagnetic layer, and
   magnetization of the first ferromagnetic layer is inclined with respect to both an in-plane direction in which the first ferromagnetic layer extends and a surface-perpendicular direction perpendicular to a surface on which the first ferromagnetic layer extends in a state in which the light is not applied from the light application part to the magnetic element.

2. The optical device according to claim 1, further comprising a magnetic field application part,
   wherein the magnetic field application part is configured to apply a magnetic field to the first ferromagnetic layer, and
   the magnetic field application part is located at a position not blocking the light applied to the magnetic element from the light application part.

3. The optical device according to claim 2, wherein the light from the light application part is not applied to the magnetic field application part.

4. The optical device according to claim 1, wherein the magnetic element further includes an anti-ferromagnetic layer, and
   the anti-ferromagnetic layer is in contact with a second surface of the first ferromagnetic layer, the second surface being a surface opposite to a first surface of the first ferromagnetic layer, the first surface being a surface contacting the spacer layer.

5. The optical device according to claim 4, wherein the anti-ferromagnetic layer includes an oxide.

6. The optical device according to claim 1, further comprising a piezoelectric element,
   wherein the piezoelectric element is configured to apply stress to the first ferromagnetic layer.

7. The optical device according to claim 6, wherein the piezoelectric element is located at a position not blocking the light applied to the magnetic element from the light application part.

8. The optical device according to claim 1, wherein, when the first ferromagnetic layer is seen in the surface-perpendicular direction, an aspect ratio obtained by dividing a length of the first ferromagnetic layer in a longitudinal direction by a length of the first ferromagnetic layer in a lateral direction is greater than 1.

* * * * *